United States Patent
Kono et al.

(10) Patent No.: US 12,522,413 B2
(45) Date of Patent: Jan. 13, 2026

(54) GAS BARRIER LAMINATE, AND GAS BARRIER PACKAGING MATERIAL AND PILLOW PACKAGING BAG FORMED OF THE LAMINATE

(71) Applicant: DAI NIPPON PRINTING CO., LTD., Tokyo (JP)

(72) Inventors: Shinichiro Kono, Tokyo (JP); Yuya Takasugi, Tokyo (JP); Yohei Yamato, Tokyo (JP); Soichiro Yabuki, Tokyo (JP); Kiyoshi Toda, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 630 days.

(21) Appl. No.: 16/497,214

(22) PCT Filed: Mar. 30, 2018

(86) PCT No.: PCT/JP2018/013611
§ 371 (c)(1),
(2) Date: Sep. 24, 2019

(87) PCT Pub. No.: WO2018/181900
PCT Pub. Date: Oct. 4, 2018

(65) Prior Publication Data
US 2020/0047960 A1    Feb. 13, 2020

(30) Foreign Application Priority Data

Mar. 31, 2017  (JP) ................. 2017-072092
Mar. 31, 2017  (JP) ................. 2017-072093
Mar. 31, 2017  (JP) ................. 2017-072094

(51) Int. Cl.
*B32B 27/40*    (2006.01)
*B32B 7/06*     (2019.01)
(Continued)

(52) U.S. Cl.
CPC ............ *B65D 65/42* (2013.01); *B32B 7/06* (2013.01); *B32B 7/12* (2013.01); *B32B 27/40* (2013.01);
(Continued)

(58) Field of Classification Search
CPC .......... B32B 1/02; B32B 15/08; B32B 15/09; B32B 15/082; B32B 15/085;
(Continued)

(56) References Cited

U.S. PATENT DOCUMENTS 4,508,767 A * 4/1985 Hokamura ............ B05D 7/574
                                                    427/407.1
4,528,234 A * 7/1985 Kaiho ...................... B32B 27/08
                                                    426/126
(Continued)

FOREIGN PATENT DOCUMENTS

| EP | 2172500 | 4/2010 |
| EP | 2583824 | 4/2013 |

(Continued)

OTHER PUBLICATIONS

Loctite Liofol LA 7660/Tycel 7276 Technical Data Sheet, Henkel, Sep. 2013, accessed online Nov. 16, 2024, https://linkpoint1.com/documents/Loctite_Liofol_LA_7660_Tycel_7276.pdf (Year: 2013).*

(Continued)

*Primary Examiner* — Michael C. Romanowski
(74) *Attorney, Agent, or Firm* — HSML P.C.

(57) ABSTRACT

The purpose of the present invention is to provide a laminate which exhibits excellent workability during production, and is excellent in easy openability, gas barrier properties and flex resistance; and a packaging material and a pillow packaging bag each formed of the laminate. The laminate is a gas barrier laminate including at least a base material layer (A), a gas barrier adhesive layer (B), a gas barrier vapor- (Continued)

```
BASE MATERIAL LAYER (A)
SOLVENT-FREE GAS BARRIER ORGANIC ADHESIVE LAYER (B)
GAS BARRIER VAPOR-DEPOSITED INORGANIC LAYER (C)
SEALANT LAYER (D)
``` deposited inorganic layer (C) and a sealant layer (D). The gas barrier laminate has a configuration in which the gas barrier vapor-deposited inorganic layer (C) is in contact with the adhesive layer (B). The adhesive layer (B) has a thickness of 0.5 to 6.0 μm.

11 Claims, 2 Drawing Sheets

(51) Int. Cl.
| | |
|---|---|
| B32B 7/12 | (2006.01) |
| B65D 65/40 | (2006.01) |
| B65D 65/42 | (2006.01) |
| C09D 175/06 | (2006.01) |
| C09J 175/06 | (2006.01) |
| C23C 16/12 | (2006.01) |
| C23C 16/40 | (2006.01) |

(52) U.S. Cl.
CPC ........... *B65D 65/40* (2013.01); *C09D 175/06* (2013.01); *C09J 175/06* (2013.01); *C23C 16/12* (2013.01); *C23C 16/401* (2013.01); *B32B 2255/20* (2013.01); *B32B 2255/205* (2013.01); *B32B 2307/7242* (2013.01); *B32B 2307/7244* (2013.01); *B32B 2307/7246* (2013.01); *B32B 2439/06* (2013.01); *B32B 2439/46* (2013.01); *B32B 2439/70* (2013.01)

(58) Field of Classification Search
CPC ... B32B 15/088; B32B 15/095; B32B 15/098; B32B 15/20; B32B 27/18; B32B 27/20; B32B 27/32; B32B 27/327; B32B 27/34; B32B 27/36; B32B 27/40; B32B 2307/7242; B32B 2307/7244; B32B 2307/7246; B32B 2439/06; B32B 2439/46; B32B 2439/70; B32B 2439/80; C23C 16/12; C23C 16/401; C23C 16/402; C23C 16/403; C23C 16/404; C09J 175/06
USPC .............................................. 428/34.1–36.92
See application file for complete search history.

(56) References Cited

U.S. PATENT DOCUMENTS

| | | | | | |
|---|---|---|---|---|---|
| 5,475,533 | A | * | 12/1995 | Steenblik | G02B 5/00 359/623 |
| 6,066,404 | A | * | 5/2000 | Suzuura | B32B 27/08 428/41.3 |
| 6,218,017 | B1 | * | 4/2001 | Yamashita | B32B 27/00 428/458 |
| 10,953,628 | B2 | * | 3/2021 | Takasugi | B32B 9/00 |
| 2002/0012803 | A1 | * | 1/2002 | Kending | B32B 27/08 53/442 |
| 2005/0031814 | A1 | * | 2/2005 | Dawes | B32B 7/06 428/347 |
| 2005/0084636 | A1 | * | 4/2005 | Papenfuss | B32B 27/08 428/43 |
| 2007/0088145 | A1 | * | 4/2007 | Mgaya | C08G 18/6705 528/44 |
| 2009/0030126 | A1 | * | 1/2009 | Uehara | C09D 183/04 524/262 |
| 2009/0035424 | A1 | * | 2/2009 | Mita | B32B 27/36 426/118 |
| 2009/0110888 | A1 | * | 4/2009 | Wuest | B32B 27/306 428/200 |
| 2009/0208759 | A1 | * | 8/2009 | Kanagawa | C08G 18/4829 428/423.1 |
| 2011/0009510 | A1 | * | 1/2011 | Gotoh | C08G 18/10 521/154 |
| 2012/0207954 | A1 | * | 8/2012 | Dalpe | B32B 27/08 156/227 |
| 2013/0130062 | A1 | * | 5/2013 | Matsumoto | B32B 27/00 428/704 |
| 2013/0167480 | A1 | * | 7/2013 | Illsley | C08J 7/0427 426/106 |
| 2015/0255761 | A1 | * | 9/2015 | Hashimoto | H01M 50/121 29/623.2 |
| 2016/0265111 | A1 | * | 9/2016 | Horiike | B32B 27/36 |
| 2016/0332430 | A1 | * | 11/2016 | Rosa | B32B 27/08 |
| 2017/0043604 | A1 | * | 2/2017 | Takahashi | B41M 5/42 |
| 2017/0334183 | A1 | * | 11/2017 | Kimura | C08G 18/4808 |
| 2018/0009202 | A1 | * | 1/2018 | Sasaki | B32B 27/36 |
| 2018/0009206 | A1 | * | 1/2018 | Murase | B32B 9/00 |
| 2018/0162983 | A1 | * | 6/2018 | Matsuoka | C08G 18/3231 |
| 2018/0297344 | A1 | * | 10/2018 | Nakashima | B32B 27/304 |
| 2018/0362785 | A1 | * | 12/2018 | Arai | B32B 27/302 |

FOREIGN PATENT DOCUMENTS

| | | | | |
|---|---|---|---|---|
| EP | 3075811 | | 10/2016 | |
| JP | H09-117986 | | 5/1997 | |
| JP | H09-268235 | | 10/1997 | |
| JP | 2000-6304 | | 1/2000 | |
| JP | 2003-312753 A | * | 11/2003 | ............ B32B 27/00 |
| JP | 3829526 | | 10/2006 | |
| JP | 2007-076281 | | 3/2007 | |
| JP | 4054972 | | 3/2008 | |
| JP | 2010-12769 | | 1/2010 | |
| JP | 2012-76291 | | 4/2012 | |
| JP | 2013-147014 | | 8/2013 | |
| JP | 2013147014 A | * | 8/2013 | |
| JP | 2013-253133 | | 12/2013 | |
| JP | 2015-058568 | | 3/2015 | |
| JP | 2015-168163 | | 9/2015 | |
| JP | 2016-068396 | | 5/2016 | |
| WO | 2012/090900 | | 7/2012 | |

OTHER PUBLICATIONS

The extended European Search Report issued for European Patent Application No. 18777203.3, Dec. 3, 2020, 6 pages.
International Preliminary Report on Patentability of PCT/JP2018/013611, Oct. 10, 2019, 14 pages.
Office Action issued for the counterpart Japanese patent application No. 2017-072093, Jun. 1, 2021, 12 pages Including machine translation.
International Search Report of PCT/JP2018/013611, mailed on Jun. 19, 2018, 4 pages including English translation.
Office Action issued in the counterpart Japanese patent application No. 2017-072092, Apr. 6, 2021, 11 pages including machine translation.
Office Action issued in the counterpart Japanese patent application No. 2017-072094, Apr. 6, 2021, 13 pages including machine translation.
Office Action issued for Japanese Patent Application No. 2021-094855, Oct. 4, 2022, 5 pages including English translation.
Office Action issued for Japanese Patent Application No. 2021-094856, Oct. 4, 2022, 3 pages including English translation.

* cited by examiner

Fig.1

| BASE MATERIAL LAYER (A) |
| --- |
| SOLVENT-FREE GAS BARRIER ORGANIC ADHESIVE LAYER (B) |
| GAS BARRIER VAPOR-DEPOSITED INORGANIC LAYER (C) |
| SEALANT LAYER (D) |

Fig.2

| BASE MATERIAL LAYER (A) |
| --- |
| GAS BARRIER VAPOR-DEPOSITED INORGANIC LAYER |
| GAS BARRIER COATING FILM LAYER (E) |
| SOLVENT-FREE GAS BARRIER ORGANIC ADHESIVE LAYER (B) |
| GAS BARRIER VAPOR-DEPOSITED INORGANIC LAYER (C) |
| SEALANT LAYER (D) |

Fig.3

| BASE MATERIAL LAYER (A) |
| --- |
| GAS BARRIER VAPOR-DEPOSITED INORGANIC LAYER |
| GAS BARRIER COATING FILM LAYER (E) |
| PRINT LAYER (F) |
| SOLVENT-FREE GAS BARRIER ORGANIC ADHESIVE LAYER (B) |
| GAS BARRIER VAPOR-DEPOSITED INORGANIC LAYER (C) |
| SEALANT LAYER (D) |

Fig.4

| BASE MATERIAL LAYER (A) |
| --- |
| ADHESIVE LAYER (B) |
| GAS BARRIER VAPOR-DEPOSITED INORGANIC LAYER (C) |
| EASILY OPENABLE SEALANT LAYER (D) |

Fig.5

| BASE MATERIAL LAYER (A) |
| --- |
| GAS BARRIER VAPOR-DEPOSITED INORGANIC LAYER |
| GAS BARRIER COATING FILM LAYER (E) |
| ADHESIVE LAYER (B) |
| GAS BARRIER VAPOR-DEPOSITED INORGANIC LAYER (C) |
| EASILY OPENABLE SEALANT LAYER (D) |

Fig.6

| BASE MATERIAL LAYER (A) |
| --- |
| GAS BARRIER VAPOR-DEPOSITED INORGANIC LAYER |
| GAS BARRIER COATING FILM LAYER (E) |
| PRINT LAYER (F) |
| ADHESIVE LAYER (B) |
| GAS BARRIER VAPOR-DEPOSITED INORGANIC LAYER (C) |
| EASILY OPENABLE SEALANT LAYER (D) |

Fig.7

| BASE MATERIAL LAYER (A) |
| --- |
| SOLVENT-FREE GAS BARRIER ORGANIC ADHESIVE LAYER (B) |
| GAS BARRIER VAPOR-DEPOSITED INORGANIC LAYER (C) |
| EASILY OPENABLE SEALANT LAYER (D) |

Fig.8

| BASE MATERIAL LAYER (A) |
| --- |
| GAS BARRIER VAPOR-DEPOSITED INORGANIC LAYER |
| GAS BARRIER COATING FILM LAYER (E) |
| SOLVENT-FREE GAS BARRIER ORGANIC ADHESIVE LAYER (B) |
| GAS BARRIER VAPOR-DEPOSITED INORGANIC LAYER (C) |
| EASILY OPENABLE SEALANT LAYER (D) |

Fig.9

| BASE MATERIAL LAYER (A) |
| --- |
| GAS BARRIER VAPOR-DEPOSITED INORGANIC LAYER |
| GAS BARRIER COATING FILM LAYER (E) |
| PRINT LAYER (F) |
| SOLVENT-FREE GAS BARRIER ORGANIC ADHESIVE LAYER (B) |
| GAS BARRIER VAPOR-DEPOSITED INORGANIC LAYER (C) |
| EASILY OPENABLE SEALANT LAYER (D) |

GAS BARRIER LAMINATE, AND GAS BARRIER PACKAGING MATERIAL AND PILLOW PACKAGING BAG FORMED OF THE LAMINATE

TECHNICAL FIELD

The present invention provides a gas barrier laminate including at least a base material layer (A), a gas barrier adhesive layer (B), a gas barrier vapor-deposited inorganic layer (C) and a sealant layer (D).

The gas barrier laminate according to the present invention has a configuration in which the gas barrier vapor-deposited inorganic layer (C) is adjacent to the adhesive layer (B) and stacked thereto, the adhesive layer (B) having a thickness of 0.5 to 6.0 μm. The present invention also relates to a gas barrier laminate further including a gas barrier coating film layer (E) and/or a print layer (F), and a gas barrier packaging material and a pillow packaging bag each formed of the gas barrier laminate. Particularly, the present invention relates to a laminate excellent in flex resistance, easy openability, an oxygen barrier property and a water vapor barrier property (having reduced permeability to oxygen and water vapor), and a packaging material and a pillow packaging bag each formed of the laminate.

Further, the packaging material according to the present invention is very suitable for various bags for packaging and bags for retort treatment.

BACKGROUND ART

In general, a packaging material having gas barrier properties is formed of a laminate including at least a base material layer, a gas barrier layer, an adhesive layer and a sealant layer, and in particular, as a gas barrier layer for improving the oxygen barrier property, a metal foil, a vapor-deposited film of metal or metal oxide, or the like is used.

It is known that a metal foil as a gas barrier layer can attain a high oxygen barrier property, but has a larger thickness as compared to a vapor-deposited film or the like, and that as a result, a packaging material using a metal foil has a large thickness, and is poor in bending resistance.

On the other hand, when a vapor-deposited film of metal or metal oxide, or the like is used, the thickness can be reduced, resulting in excellent bending resistance or the like, but it is difficult to achieve a sufficient oxygen barrier property probably because the surface of the vapor-deposited film has irregularities.

Patent Literature 1 discloses as an oxygen barrier material a gas (oxygen) barrier thermosetting polyurethane resin containing a cured resin product obtained by reacting an active hydrogen-containing compound (A) and an organic polyisocyanate compound (B).

Patent Literature 1 discloses a gas (oxygen) barrier composite film (which includes a base material film layer and a layer containing the gas barrier thermosetting polyurethane resin) using an oxygen barrier thermosetting polyurethane resin, and the oxygen barrier thermosetting polyurethane resin is characterized by that the cured resin product therein contains 20% by mass or more of a backbone structure derived from meta-xylene diisocyanate, and that the amount of tri-or-higher-functional compounds in the compounds (A) and (B) is 7% by mass or more based on the total amount of the compounds (A) and (B).

Further, Patent Literature 2 discloses a barrier laminate including: a transparent coated film including a polymer film base material and a thin film layer formed on at least one side of the base material and formed of silicon oxide or aluminum oxide; and a heat-sealable resin film, wherein the thin film layer of the coated film and the heat-sealable resin film are bonded to each other by a dry lamination method with a barrier adhesive interposed therebetween, the barrier adhesive containing particles of one or more materials selected from materials of inorganic silicon oxide and aluminum oxide, a polyester polyol and an isocyanate compound; and a packaging material using the barrier laminate.

However, in Patent Literature 1, a solvent having high polarity should be used for the composition, resulting in poor workability. When for example, a solvent having a high dissolving ability, such as acetone, is used, the controlled viscosity is apt to increase due to reaction of water with isocyanate because the solvent has a low boiling point and easily absorbs water in ambient air.

Further, in Patent Literature 2, the inorganic compound contained in the adhesive is an inorganic compound having a spherical shape with a nano-order particle size or irregular shape, and therefore the oxygen barrier property of the adhesive itself, particularly when a bending load is applied, is not high, which is problematic.

CITATION LIST

Patent Literature

Patent Literature 1: Japanese Patent No. 4054972
Patent Literature 2: Japanese Patent No. 3829526

SUMMARY OF INVENTION

Technical Problem

It is an object of the present invention to solve the above-described problems and provide a laminate which has a small total number of constituent layers, exhibits excellent workability during production of the laminate, and is excellent in easy openability, gas barrier properties and flex resistance; and a packaging material and a pillow packaging bag each formed of the laminate.

Solution to Problem

The present inventors have extensively conducted studies, and resultantly found that the above-described object is achieved by a gas barrier laminate including at least a base material layer (A), a gas barrier adhesive layer (B), a gas barrier vapor-deposited inorganic layer (C) and a sealant layer (D), the gas barrier laminate having a configuration in which the gas barrier vapor-deposited inorganic layer (C) is adjacent to the adhesive layer (B), the adhesive layer (B) having a thickness of 0.5 to 6.0 μm; a gas barrier laminate further including a gas barrier coating film layer (E) and a print layer (F); and a gas barrier packaging material which is formed of the gas barrier laminate.

The present invention has the following features.

1. A gas barrier laminate comprising at least a base material layer (A), a gas barrier adhesive layer (B), a gas barrier vapor-deposited inorganic layer (C) and a sealant layer (D), the gas barrier adhesive layer (B) being adjacent to the gas barrier vapor-deposited inorganic layer (C) and stacked thereto, the gas barrier adhesive layer (B) having a thickness of 0.5 to 6.0 μm.

2. The gas barrier laminate described in the item 1, wherein the gas barrier adhesive layer (B) is a solvent-free gas barrier organic adhesive layer, the solvent-free gas barrier organic adhesive layer is a layer formed by applying a two-pack curable solvent-free adhesive and curing the adhesive, and the solvent-free gas barrier organic adhesive layer has a solvent content of 0 or 6 mg/m$^2$ or less.

3. The gas barrier laminate described in item 1 or 2, wherein the sealant layer (D) is an easily openable sealant layer.

4. The gas barrier laminate described in one of items 1 to 3, comprising a gas barrier coating film layer (E) between the base material layer (A) and the gas barrier adhesive layer (B), the gas barrier coating film layer (E) containing a hydrolytic polycondensation product of a mixture of a metal alkoxide and a water-soluble polymer by a sol-gel process.

5. The gas barrier laminate described in any one of items 1 to 4, comprising a print layer (F) between the base material layer (A) and the gas barrier adhesive layer (B).

6. The gas barrier laminate described in any one of items 1 to 5, wherein the gas barrier vapor-deposited inorganic layer (C) is a layer having one or more selected from the group consisting of a vapor-deposited aluminum layer, a vapor-deposited alumina layer and a vapor-deposited silica layer.

7. The gas barrier laminate described in any one of items 1 to 6, wherein the gas barrier vapor-deposited inorganic layer (C) is a layer having a vapor-deposited aluminum layer.

8. The gas barrier laminate described in any one of items 1 to 7, wherein the gas barrier vapor-deposited inorganic layer (C) has a thickness of 1 to 100 nm.

9. The gas barrier laminate described in any one of items 1 to 8, wherein the gas barrier laminate is used as an oxygen barrier and a water vapor barrier, and has an oxygen permeability of 0.05 to 2.0 cc/m$^2$/day/atm in an environment at 23° C. and 90% RH, and a water vapor permeability of 0.01 to 2.0 g/m$^2$/day/atm in an environment at 40° C. and 90% RH.

10. The gas barrier laminate described in any one of items 1 to 8, wherein after a bending load is applied five times by a Gelbo Flex tester, the oxygen permeability of the gas barrier laminate in an environment at 23° C. and 90% RH is larger by 0 or 20.0 cc/m$^2$/day/atm or less than that before the bending load application.

11. The gas barrier laminate described in any one of items 1 to 8, wherein after a bending load is applied five times by a Gelbo Flex tester, the oxygen permeability of the gas barrier laminate in an environment at 23° C. and 90% RH is larger by 0, or 10.0 cc/m$^2$/day/atm or less than that before the bending load application.

12. The gas barrier laminate described in any one of items 1 to 8, wherein after a packing load is applied once by a vertical pillow packing machine, the oxygen permeability of the gas barrier laminate in an environment at 23° C. and 90% RH is larger by 0 or 10.0 cc/m$^2$/day/atm or less than that before the packing load application, and the water vapor permeability of the gas barrier laminate in an environment at 40° C. and 90% RH is larger by 0, or 5.0 g/m$^2$/day/atm or less than that before the packing load application.

13. The gas barrier laminate described in any one of items 1 to 12, wherein the total number of constituent layers is 6 or less.

14. The gas barrier laminate described in any one of items 3 to 12, wherein the gas barrier laminate comprises the easily openable sealant layer and is easily openable.

15. A gas barrier packaging material comprising the gas barrier laminate described in any one of items 1 to 14.

16. A pillow packaging bag comprising the gas barrier laminate described in any one of items 1 to 14.

Advantageous Effects of Invention

A gas barrier laminate and a gas barrier packaging material formed of the gas barrier laminate according to the present invention includes at least a base material layer (A), a solvent-free gas barrier organic adhesive layer (B), a gas barrier vapor-deposited inorganic layer (C) and a sealant layer (D), and has a configuration in which the gas barrier vapor-deposited inorganic layer (C) is in contact with the solvent-free gas barrier organic adhesive layer (B).

The solvent-free gas barrier organic adhesive layer (B) can be a layer formed by applying a two-pack curable solvent-free adhesive and curing the adhesive, and the solvent-free gas barrier organic adhesive layer (B) can have a solvent content of 0, or 6 mg/m$^2$ or less. The gas barrier laminate can further include a gas barrier coating film layer (E) and/or a print layer (F). By combining the gas barrier vapor-deposited inorganic layer (C) and the solvent-free gas barrier organic adhesive layer (B) in such a manner that the layers are adjacent to each other, recesses of irregularities present on the surface of the gas barrier vapor-deposited inorganic layer (C) are filled by the solvent-free gas barrier organic adhesive layer (B) to flatten the surface, so that gas barrier properties over the surface are made uniform. Thus, high gas barrier properties which have so far not been attainable can be exhibited while the thickness of the gas barrier vapor-deposited inorganic layer is reduced to maintain flex resistance.

Further, since the solvent-free gas barrier organic adhesive layer (B) is solvent-free, and has a solvent content of 0, or 6 mg/m$^2$ or less, further improvement of gas barrier properties and reduction of transfer of solvent odors to contents can be exhibited.

Further, an easily openable gas barrier laminate and an easily openable gas barrier packaging material formed of the easily openable gas barrier laminate according to the present invention includes at least a base material layer (A), a gas barrier adhesive layer (B), a gas barrier vapor-deposited inorganic layer (C) and an easily openable sealant layer (D), and has a configuration in which the gas barrier vapor-deposited inorganic layer (C) is adjacent to the adhesive layer (B), and the adhesive layer (B) has a thickness of 0.5 to 6.0 μm. The easily openable gas barrier laminate can further include a gas barrier coating film layer (E) and a print layer (F). By combining the gas barrier vapor-deposited inorganic layer (C) and the gas barrier adhesive layer (B) in such a manner that the layers are adjacent to each other, recesses of irregularities present on the surface of the gas barrier vapor-deposited inorganic layer (C) are filled by the adhesive layer (B) with gas barrier properties to flatten the surface, so that gas barrier properties over the surface are made uniform. Thus, gas barrier properties equivalent to or higher than the gas barrier properties of conventional gas barrier laminates can be exhibited with a small total number of constituent layers while the thickness of the gas barrier vapor-deposited inorganic layer (C) is reduced to maintain flex resistance.

Further, since the easily openable sealant layer (D) is present, easily openability can be exhibited.

Further, an easily openable gas barrier laminate and an easily openable gas barrier packaging material formed of the easily openable gas barrier laminate according to the present invention includes at least a base material layer (A), a solvent-free gas barrier organic adhesive layer (B), a gas barrier vapor-deposited inorganic layer (C) and an easily openable sealant layer (D), and has a configuration in which the gas barrier vapor-deposited inorganic layer (C) is in contact with the solvent-free gas barrier organic adhesive layer (B).

The solvent-free gas barrier organic adhesive layer (B) is a layer formed by applying a two-pack curable solvent-free adhesive and curing the adhesive, and has a thickness of 0.5 to 6 mm and a solvent content of 0, or 6 mg/m$^2$ or less. Preferably, the easily openable gas barrier laminate further includes a gas barrier coating film layer (E) and/or a print layer (F). By combining the gas barrier vapor-deposited inorganic layer (C) and the solvent-free gas barrier organic adhesive layer (B) in such a manner that the layers are adjacent to each other, recesses of irregularities present on the surface of the gas barrier vapor-deposited inorganic layer (C) are filled by the solvent-free gas barrier organic adhesive layer (B) to flatten the surface, so that gas barrier properties over the surface are made uniform. Thus, gas barrier properties equivalent to or higher than the gas barrier properties of conventional gas barrier laminates can be exhibited with a small total number of constituent layers while the thickness of the gas barrier vapor-deposited inorganic layer is reduced to maintain flex resistance.

Further, since the solvent-free gas barrier organic adhesive layer (B) is solvent-free, and has a solvent content of 0, or 6 mg/m$^2$ or less, further improvement of gas barrier properties and reduction of transfer of solvent odors to contents can be exhibited. Further, since the easily openable sealant layer (D) is present, the package can exhibit easy openability.

BRIEF DESCRIPTION OF DRAWINGS

FIG. 1 is a schematic sectional view showing an example of the layer configuration of a gas barrier laminate according to the present invention that includes a solvent-free gas barrier organic adhesive layer.

FIG. 2 is a schematic sectional view showing another example of the layer configuration of the gas barrier laminate according to the present invention.

FIG. 3 is a schematic sectional view showing still another example of the layer configuration of the gas barrier laminate according to the present invention.

FIG. 4 is a schematic sectional view showing an example of the layer configuration of an easily openable gas barrier laminate according to the present invention.

FIG. 5 is a schematic sectional view showing another example of the layer configuration of the easily openable gas barrier laminate according to the present invention.

FIG. 6 is a schematic sectional view showing still another example of the layer configuration of the easily openable gas barrier laminate according to the present invention.

FIG. 7 is a schematic sectional view showing an example of the layer configuration of an easily openable gas barrier laminate according to the present invention that includes a solvent-free gas barrier organic adhesive layer.

FIG. 8 is a schematic sectional view showing another example of the layer configuration of the gas barrier laminate according to the present invention.

FIG. 9 is a schematic sectional view showing still another example of the layer configuration of the gas barrier laminate according to the present invention.

DESCRIPTION OF EMBODIMENTS

A gas barrier laminate and a gas barrier packaging material and a pillow packaging bag each formed of the gas barrier laminate according to the present invention will be described in detail below with reference to the drawings.

The total number of constituent layers in the present invention is the detailed number of layers forming the laminate, such as a base material layer, a gas barrier layer, an adhesive layer and a sealant layer, and includes the number of layers including special coating layers such as vapor-deposited layers and AC coatings in the layers. For example, a PET film layer with a vapor-deposited aluminum layer is considered as two layers.

FIGS. 1 to 9 are schematic sectional views showing an example of a layer configuration of the gas barrier laminate according to the present invention.

The gas barrier laminate according to the present invention has as a basic structure a configuration in which a base material layer (A), a solvent-free gas barrier organic adhesive layer (B), a gas barrier vapor-deposited inorganic layer (C) and a sealant layer (D) are stacked as shown in FIG. 1.

In another embodiment of the gas barrier laminate according to the present invention, a gas barrier vapor-deposited inorganic layer different from the gas barrier vapor-deposited inorganic layer (C), and a gas barrier coating film layer (E) may be further stacked between the base material layer (A) and the solvent-free gas barrier organic adhesive layer (B) as shown in FIG. 2.

In still another embodiment of the laminate according to the present invention, a print layer (F) may be stacked between the base material layer (A) and the solvent-free gas barrier organic adhesive layer (B) as shown in FIG. 3.

Further, an easily openable gas barrier laminate according to the present invention has as a basic structure a configuration in which a base material layer (A), a gas barrier adhesive layer (B), a gas barrier vapor-deposited inorganic layer (C) and an easily openable sealant layer (D) are stacked as shown in FIG. 4.

In another embodiment of the easily openable gas barrier laminate according to the present invention, a gas barrier vapor-deposited inorganic layer different from the gas barrier vapor-deposited inorganic layer (C), and a gas barrier coating film layer (E) may be further stacked between the base material layer (A) and the adhesive layer (B) as shown in FIG. 5.

In still another embodiment of the laminate according to the present invention, a print layer (F) may be stacked between the base material layer (A) and the gas barrier adhesive layer (B) as shown in FIG. 6.

Further, an easily openable gas barrier laminate according to the present invention has as a basic structure a configuration in which a base material layer (A), a solvent-free gas barrier organic adhesive layer (B), a gas barrier vapor-deposited inorganic layer (C) and an easily openable sealant layer (D) are stacked as shown in FIG. 7.

In another embodiment of the easily openable gas barrier laminate according to the present invention, a gas barrier vapor-deposited inorganic layer different from the gas barrier vapor-deposited inorganic layer (C), and a gas barrier coating film layer (E) may be further stacked between the base material layer (A) and the solvent-free gas barrier organic adhesive layer (B) as shown in FIG. 8.

In still another embodiment of the easily openable gas barrier laminate according to the present invention, a print layer (F) may be stacked between the base material layer (A) and the solvent-free gas barrier organic adhesive layer (B) as shown in FIG. 9.

The examples described above are illustrations of the easily openable gas barrier laminates according to the present invention, and the present invention is not limited thereto.

Materials, production methods and so on for the easily openable gas barrier laminates according to the present invention will now be described.

The resin nomenclature for use in the present invention is that commonly used in the art. Further, the present invention is not limited to various specific examples described hereinbelow.

[Base Material Layer (A)]

For the base material layer (A), an inorganic material such as a metal or a metal oxide or an organic material such as a resin which is excellent in chemical or physical strength, withstands conditions for formation of a vapor-deposited inorganic film, and the like, and can be favorably maintained without impairing the properties of the vapor-deposited inorganic film and the like, for example, can be used in the form of a film or a sheet.

As the base material layer (A), a single-layer film or a multilayer laminated film is used, but any film to be used for various packaging materials can be used without particular limitation. Among these, suitable one can be arbitrarily selected and used in view of the type of contents to be packaged, and use conditions, for example, whether heating treatment is performed or not after packing.

Specific examples of the film that is preferably used as the base material layer (A) include paper, aluminum foils, cellophane, polyamide-based resin films, polyester-based resin films, olefin-based resin films, acid-modified polyolefin-based resin films, polystyrene-based resin films, polyurethane-based resin films, acetal-based resin films, films obtained by uniaxially or biaxially stretching the foregoing films, PVDC-coated films, resin films formed of low-density polyethylene, medium-density polyethylene, high-density polyethylene, linear low-density polyethylene, polypropylene, polybutene, polyvinyl alcohol, ethylene-vinyl acetate copolymers, ionomers, ethylene-(meth)acrylic acid copolymers, ethylene-(meth)acrylic acid ester copolymers, ethylene-propylene copolymers, methyl pentene, polyacrylonitrile, acrylonitrile-styrene copolymers, acrylonitrile-butadiene-styrene copolymers, polycarbonate, polyvinyl chloride (PVC), polyvinylidene chloride (PVDC), polyvinylidene fluoride (PVDF), ethylene-tetrafluoroethylene copolymers (ETFE), polytetrafluoroethylene (PTFE), polyethylene terephthalate (PET), polybutylene terephthalate, polyethylene naphthalate and the like, PVDC-coated oriented polypropylene films, PVDC-coated oriented nylon films, and composite films obtained by laminating two or more of the foregoing films.

Among them, uniaxially or biaxially stretched oriented polyester films of polyethylene terephthalate, polyethylene naphthalate and the like, uniaxially or biaxially stretched oriented polyamide films of polyamides such as nylon 6, nylon 66 and MXD 6 (polymetaxylylene adipamide), biaxially stretched oriented polypropylene (OPP) films and the like can be preferably used. Further, transparent PET with vapor deposited coating such as PET with vapor-deposited silica and PET with vapor-deposited alumina, and biaxially stretched oriented polypropylene (OPP) films with vapor-deposited aluminum, and the like are preferred.

(Thickness)

The thickness of the base material layer (A) is arbitrarily selected and can be arbitrarily selected within the range of about 1 μm to 300 μm, preferably 1 to 100 μm in view of formability and transparency. When the thickness is below this range, strength is insufficient, and when the thickness is above this range, rigidity may be so high that processing becomes difficult.

(Surface Treatment)

For improving the adhesion of the base material layer (A) and a film or a sheet for the base material layer (A) with adhesive layers such as the adhesive layer (B) or vapor-deposited inorganic layers such as the gas barrier vapor-deposited inorganic layer (C), a surface treatment may be applied to the adhesion surface of the base material layer (A) and the film or the sheet for the base material layer (A), if necessary, before lamination or vapor deposition, including physical treatment such as corona discharge treatment, ozone treatment, low-temperature plasma treatment using oxygen gas, nitrogen gas or the like, or glow discharge treatment, chemical treatment such as oxidation treatment using a chemical agent, treatment for formation of an adhesive layer, a primer coating layer, an undercoating layer, a vapor-deposited anchor coating layer or the like, and other treatment. After the surface treatment, a vapor-deposited inorganic layer may be provided, followed by providing on the vapor-deposited inorganic layer a barrier coating layer such as a gas barrier coating film layer (E) as described later.

(Method for Forming Film)

The resin film or sheet to be used for the base material layer (A) can be produced by, for example, a conventional film formation method such as an extrusion method, a casting method, a T-die method, a cutting method or an inflation method using one or more resins selected from the group consisting of the above-described resins, or by a multilayer coextrusion film formation method using two or more resins. Further, for the strength, the dimensional stability and the heat resistance of the film, the film can be uniaxially or biaxially stretched using, for example, a tenter system or a tubular system.

(Additives)

For the purpose of improving or modifying processability, heat resistance, weather resistance, mechanical properties, dimensional stability, oxidation resistance, slipperiness, releasability, flame retardance, mold resistance, electrical properties, strength and the like, the resin film or sheet to be used for the base material layer (A) may contain plastic compounding agents, additives and the like such as a lubricant, a crosslinker, an antioxidant, an ultraviolet absorber, a light stabilizer, a filler, a reinforcing agent, an antistatic agent and a pigment. The amount of these agents added can be arbitrarily determined according to a purpose within the bounds of not adversely affecting unassociated properties.

[Gas Barrier Adhesive Layer (B)]

The adhesive layer (B) in the gas barrier laminate according to the present invention has gas barrier properties, particularly oxygen and water vapor barrier properties.

The thickness of the adhesive layer (B) is 0.5 to 6.0 μm, preferably 0.8 to 5.0 μm, more preferably 1.0 to 4.5 μm. When the thickness is below the above-described range, the laminate is apt to have insufficient gas barrier properties, and when the thickness is above the above-described range, the laminate is apt to have poor bending resistance, leading to deterioration of gas barrier properties after bending.

The adhesive resin composition that forms the adhesive layer (B) is, for example, an adhesive resin composition containing a polyol (J) having two or more hydroxyl groups per molecule, an isocyanate compound (K) having two or more isocyanate groups per molecule, and a phosphoric acid-modified compound (L), the polyol (J) having as main backbones one or more selected from the group consisting of a polyester structure, a polyester polyurethane structure, a polyether structure and a polyether polyurethane structure. The adhesive resin composition may further contain a plate-shaped inorganic compound (M).

The glass transition temperature of a cured coating film of the adhesive resin composition is preferably within the range of −30° C. to 80° C., more preferably 0° C. to 70° C., still more preferably 25° C. to 70° C. When the glass transition temperature is higher than 80° C., the cured coating film may have reduced flexibility around room temperature, and hence poor adhesion to the base material, leading to reduction of adhesive strength. On the other hand, when the glass transition temperature is lower than −30° C., it may be impossible to exhibit a sufficient oxygen barrier because of vigorous molecular movement in the cured coating film around normal temperature, or adhesive strength may be reduced due to insufficient cohesion.

As a specific example of such an adhesive resin composition containing a polyol (J), an isocyanate compound (K) and a phosphoric acid-modified compound (L), the oxygen barrier adhesive series "PASLIM" sold by DIC Corporation can be used, and in particular, PASLIM VM001/VM102CP, which is a composition including a polyester-based main backbone and a compound having two or more isocyanate groups as a curing agent, and the like are preferably used.
(Polyol (J))

The polyester structure in the polyol (J) is obtained by polycondensation reaction of a polycarboxylic acid with a polyhydric alcohol by a known conventional method.

Examples of the polycarboxylic acid include aliphatic polycarboxylic acids and aromatic polycarboxylic acids.

Specific examples of the aliphatic polycarboxylic acid include succinic acid, adipic acid, azelaic acid, sebacic acid, dodecanedicarboxylic acid and 1,4-cyclohexanedicarboxylic acid.

Specific examples of the aromatic polycarboxylic acid include polybasic acids such as orthophthalic acid, terephthalic acid, isophthalic acid, pyromellitic acid, trimellitic acid, 1,2-naphthalenedicarboxylic acid, 1,8-naphthalenedicarboxylic acid, 2,3-naphthalenedicarboxylic acid, 1,4-naphthalenedicarboxylic acid, 2,5-naphthalenedicarboxylic acid, 2,6-naphthalenedicarboxylic acid, naphthalic acid, biphenyldicarboxylic acid, 1,2-bis(phenoxy)ethane-p,p'-dicarboxylic acid, and anhydrides or ester-formable derivatives of these dicarboxylic acids; and p-dihydroxybenzoic acid, p-(2-hydroxyethoxy)benzoic acid, and ester-formable derivatives of these dihydroxycarboxylic acids.

Specific examples of the ortho-oriented aromatic dicarboxylic acid include orthophthalic acid, 1,2-naphthalenedicarboxylic acid, 1,8-naphthalenedicarboxylic acid, 2,3-naphthalenedicarboxylic acid, and anhydrides or ester-formable derivatives of these dicarboxylic acids.

These polycarboxylic acids can be used singly, or in combination of two or more thereof.

Examples of the polyhydric alcohol include aliphatic polyhydric alcohols and aromatic polyhydric phenols.

Specific examples of the aliphatic polyhydric alcohol include ethylene glycol, propylene glycol, butylene glycol, neopentyl glycol, cyclohexane dimethanol, 1,5-pentanediol, 3-methyl-1,5-pentanediol, 1,6-hexanediol, methyl pentanediol, dimethyl butanediol, butyl ethyl propanediol, diethylene glycol, triethylene glycol, tetraethylene glycol, dipropylene glycol and tripropylene glycol.

Specific examples of the aromatic polyhydric phenol include hydroquinone, resorcinol, catechol, naphthalenediol, biphenol, bisphenol A, bisphenol F, tetramethyl biphenol, and ethylene oxide extended products and hydrogenated cycloaliphatics thereof.

(Isocyanate Compound (K))

The isocyanate compound (K) has two or more isocyanate groups per molecule, and may be either aromatic or aliphatic, and either a low-molecular weight compound or a high-molecular weight compound, and known compounds such as diisocyanate compounds having two isocyanate groups, and polyisocyanate compounds having three or more isocyanate groups can be used. The isocyanate compound (K) may be a blocked isocyanate compound obtained by carrying out addition reaction by an appropriate known conventional method using a known isocyanate blocking agent.

In particular, in view of adhesiveness and resistance to retort treatment, polyisocyanate compounds are preferred, and in view of imparting an oxygen barrier property, compounds having an aromatic ring are preferable. In particular, isocyanate compounds containing a meta-xylene backbone are preferable because the oxygen barrier property can be improved not only by hydrogen bonds of urethane groups but also by $\pi$-$\pi$ stacking between aromatic rings.

Specific examples of the isocyanate compound (K) include tetramethylene diisocyanate, hexamethylene diisocyanate, toluene diisocyanate, diphenylmethane diisocyanate, hydrogenated diphenylmethane diisocyanate, metaxylylene diisocyanate, hydrogenated xylylene diisocyanate, isophorone diisocyanate, trimers of these isocyanate compounds, and adducts, biurets and allophanates obtained by reacting an excessive amount of these isocyanate compounds with, for example, low-molecular active hydrogen compounds such as ethylene glycol, propylene glycol, metaxylylene alcohol, 1,3-bishydroxyethylbenzene, 1,4-bishydroxyethylbenzene, trimethylolpropane, glycelol, pentaerythritol, erythritol, sorbitol, ethylenediamine, monoethanolamine, diethanolamine, triethanolamine and metaxylylene diamine, alkylene oxide adducts thereof, high-molecular active hydrogen compounds such as various polyester resins, polyether polyols and polyamides, and the like.
(Phosphoric Acid-Modified Compound (L))

The phosphoric acid-modified compound (L) is effective in enhancement of adhesive strength to an inorganic member, and a known conventional phosphoric acid-modified compound can be used.

Specific examples of the phosphoric acid-modified compound include phosphoric acid, pyrrolic acid, triphosphoric acid, methyl acid phosphate, ethyl acid phosphate, butyl acid phosphate, dibutyl phosphate, 2-ethylhexyl acid phosphate, bis(2-ethylhexyl)phosphate, isododecyl acid phosphate, butoxy ethyl acid phosphate, oleyl acid phosphate, tetracosyl acid phosphate, 2-hydroxyethyl methacrylate acid phosphate and polyoxyethylene alkyl ether phosphates, and one or more of these compounds can be used.
(Solvent)

The solvent is not particularly limited as long as it is capable of dissolving the polyol (J) and the isocyanate compound (K), and uniformly dispersing the phosphoric acid-modified compound (L) and the plate-shaped inorganic compound (M), and has an appropriate boiling point and appropriate volatility with respect to a process for production of the easily openable gas barrier laminate according to the present invention.
(Plate-Shaped Inorganic Compound (M))

The plate-shaped inorganic compound (M) is effective in improvement of the lamination strength and the gas barrier properties of the gas barrier adhesive layer (B) obtained by curing an adhesive resin composition.

Specific examples of the plate-shaped inorganic compound (M) include kaolinite-serpentine clay minerals (halloysite, kaolinite, endellite, dickite, nacrite and the like, antigorite, chrysotile and the like), and pyrophyllite-talc groups (pyrophyllite, talc, kerolite and the like), and one or more of these compounds can be used.

Further, the solvent-free gas barrier organic adhesive layer (B) in the gas barrier laminate according to the present invention is formed with no solvent, and has gas barrier properties, particularly oxygen and water vapor barrier properties.

The solvent content of the solvent-free gas barrier organic adhesive layer (B) is 0, or 6 mg/m$^2$ or less. For reducing the solvent content, the curable isocyanate resin composition which forms the solvent-free gas barrier organic adhesive layer (B) is required to be a two-pack curable solvent-free adhesive. In lamination, the two-pack curable solvent-free adhesive is heated to reduce the viscosity while being kept solvent-free.

Use of a solvent having high polarity for the curable isocyanate resin composition leads to poor workability. When for example, a solvent having a high dissolving ability, such as acetone, is used, the viscosity of the curable isocyanate resin composition is apt to increase due to reaction of water with isocyanate because the solvent has a low boiling point and easily absorbs water in ambient air.

Further, when the solvent-free gas barrier organic adhesive layer (B) contains a large amount of a solvent, the solvent may reduce bonding between layers of the laminate, and solvent odors may be transferred to contents in a package made of a packaging material using the obtained laminate. Further, due to volume reduction during drying, the solvent-free gas barrier organic adhesive layer (B) filling recesses of irregularities present on the surface of the gas barrier vapor-deposited inorganic layer (C) is peeled off to generate defects, so that gas barrier properties are easily deteriorated, and at the time of bending the laminate, considerable peeling from the recesses easily occurs, leading to deterioration of gas barrier properties.

The thickness of the solvent-free gas barrier organic adhesive layer (B) is 0.5 to 6.0 µm, preferably 0.8 to 5.0 µm, more preferably 1.0 to 4.5 µm. When the thickness is below the above-described range, the laminate is apt to have insufficient gas barrier properties, and when the thickness is above the above-described range, the laminate is apt to have poor bending resistance, leading to deterioration of gas barrier properties after bending.

(Two-Pack Curable Solvent-Free Adhesive)

Examples of the two-pack curable solvent-free adhesive that forms the gas barrier organic adhesive layer (B) include two-pack curable solvent-free adhesives containing the polyol (J) having two or more hydroxyl groups per molecule, the isocyanate compound (K) having two or more isocyanate groups per molecule, and the phosphoric acid-modified compound (L).

Here, the main backbone of the polyol (J) having two or more hydroxyl groups per molecule has a polyester structure or a polyester polyurethane structure, and 70 to 100% by mass of the moiety of a polycarboxylic acid-derived structure in the polyester structure or the polyester polyurethane structure is derived from an ortho-oriented aromatic dicarboxylic acid.

The polycarboxylic acid encompasses polycarboxylic acids, and anhydrides and ester-formable derivatives thereof, and the ortho-oriented aromatic dicarboxylic acid encompasses ortho-oriented aromatic dicarboxylic acids, and anhydrides and ester-formable derivatives thereof.

The two-pack curable solvent-free adhesive may further contain one or more selected from the group consisting of a plate-shaped inorganic compound (M), a polyester polyol (P) having two or more hydroxy groups per molecule, and a polycarboxylic acid-modified polyester polyol (N) having one or more carboxylic groups and two or more hydroxyl groups per molecule.

In particular, a two-pack curable solvent-free adhesive containing the polycarboxylic acid-modified polyester polyol (N) and the isocyanate compound (K) having two or more isocyanate groups per molecule, and having an acid value of 20 mg KOH/g or more is preferable.

The glass transition temperature of a cured coating film of the two-pack curable solvent-free adhesive is preferably within the range of −30° C. to 80° C., more preferably 0° C. to 70° C., still more preferably 25° C. to 70° C. When the glass transition temperature is higher than 80° C., the cured coating film may have reduced flexibility around room temperature, and hence poor adhesion to the base material, leading to reduction of adhesive strength.

On the other hand, when the glass transition temperature is lower than −30° C., it may be impossible to exhibit a sufficient oxygen barrier because of vigorous molecular movement in the cured coating film around normal temperature, or adhesive strength may be reduced due to insufficient cohesion.

Specific examples of the curable isocyanate resin composition for adhesive layers, which contains a solvent but has an oxygen barrier property, include PASLIM VM001/VM102CP of the oxygen barrier adhesive series "PASLIM" sold by DIC Corporation.

Here, as the polyol (J), the isocyanate compound (K), the phosphoric acid-modified compound (L) and the plate-shaped inorganic compound (M), those described above are used.

(Polycarboxylic Acid-Modified Polyester Polyol (N))

The polycarboxylic acid-modified polyester polyol (N) having one or more carboxyl groups and two or more hydroxyl groups per molecule is obtained by reacting a polycarboxylic acid with some of hydroxyl groups of a polyester polyol having three or more hydroxyl groups per molecule.

[Gas Barrier Vapor-Deposited Inorganic Layer (C)]

The gas barrier vapor-deposited inorganic layer (C) is a gas barrier film having gas barrier properties so that permeation of oxygen gas, water vapor and the like are prevented. Examples of the gas barrier vapor-deposited inorganic layer (C) include vapor-deposited films formed of an inorganic substance or an inorganic oxide.

In general, ultrafine irregularities are present on the surface of a vapor-deposited inorganic layer, and from a microscopic point of view, the vapor-deposited inorganic layer does not have a uniform thickness, and thin portions have low gas barrier properties in a direction along the surface.

However, the laminate according to the present invention has a configuration in which the gas barrier vapor-deposited inorganic layer (C) is in contact with the adhesive layer (B), so that recesses of ultrafine irregularities present on the surface of the gas barrier vapor-deposited inorganic layer (C) are filled by the adhesive layer (B) with gas barrier properties to flatten the surface. Thus, gas barrier properties over the surface are made uniform, so that gas barrier properties equivalent to or higher than the gas barrier properties of conventional gas barrier laminates can be exhibited while the thickness of the gas barrier vapor-deposited inorganic layer (C) is reduced to maintain flex resistance.

The gas barrier vapor-deposited inorganic layer (C) is preferably a layer having one or more selected from the group consisting of a vapor-deposited aluminum layer, a vapor-deposited alumina layer and a vapor-deposited silica layer, particularly preferably a layer having a vapor-deposited aluminum layer.

The gas barrier vapor-deposited inorganic layer (C) can be provided directly on the sealant layer (D) without interposition of an adhesion layer such as the adhesive layer (B).

Further, if necessary, a light shielding property can be imparted so that transmission of visible light and ultraviolet rays are prevented. The gas barrier vapor-deposited inorganic layer (C) may include one or more layers. When the gas barrier vapor-deposited inorganic layer (C) includes two or more layers, these layers may have the same composition or different compositions.

The thickness of the gas barrier vapor-deposited inorganic layer (C) is preferably 1 to 200 nm. The more preferable thickness varies depending on the species to be vapor-deposited. In the case of a vapor-deposited aluminum film, the thickness is more preferably 1 to 100 nm, still more preferably 15 to 60 nm, especially preferably 10 to 40 nm.

In the case of a vapor-deposited silicon oxide or alumina film, the thickness is more preferably 1 to 100 nm, still more preferably 10 to 50 nm, especially preferably 20 to 30 nm.

The gas barrier vapor-deposited inorganic layer (C) can be formed by a conventionally known method using a conventionally known inorganic substance or inorganic oxide, and the composition and the formation method for the gas barrier vapor-deposited inorganic layer (C) are not particularly limited.

Examples of the formation method include physical vapor deposition methods (PVD methods) such as a vacuum vapor deposition method, a sputtering method and an ion plating method, and chemical vapor deposition methods (CVD methods) such as a plasma-enhanced chemical vapor deposition method, a thermochemical vapor deposition method and a photochemical vapor deposition method.

In the present invention, the gas barrier vapor-deposited inorganic layer (C) can be provided on a surface of the sealant layer (D) on the adhesive layer (B) side.

Further, here, pretreatment can be applied to the surface of the sealant layer (D) if necessary, and specifically, physical treatment such as corona discharge treatment, ozone treatment, low-temperature plasma treatment using oxygen gas or nitrogen gas, or glow discharge treatment, or chemical treatment such as oxidation treatment performed using a chemical agent may be applied.

In the gas barrier laminate according to the present invention, for further enhancing gas barrier properties against oxygen gas, water vapor and the like, a gas barrier vapor-deposited inorganic layer similar to the gas barrier vapor-deposited inorganic layer (C) can be provided on the base material layer (A) on a side where the base material layer (A) is in contact with the adhesive layer (B). The pretreatment, the species to be vapor-deposited, the method for formation of a vapor-deposited film, and the like therefor are similar to those for the gas barrier vapor-deposited inorganic layer (C).

[Sealant Layer (D) (Heat-Sealing Layer)]

The sealant layer (D) imparts a heat-sealing property and functions such as flex resistance and impact resistance to a gas barrier laminate and a packaging material formed of the gas barrier laminate according to the present invention. In particular, the sealant layer (D) is preferably capable of imparting flex resistance to suppress deterioration of gas barrier properties after bending.

In the present invention, materials satisfying conditions as described above can be arbitrarily used.

In the present invention, it is desirable that the sealant layer (D) have a heat-sealable resin layer. The heat-sealable resin layers are thermally melted and welded to each other.

Examples of the resin suitable for the sealant layer (D) include polyethylene, low-density polyethylene, medium-density polyethylene, high-density polyethylene, straight chain (linear) low-density polyethylene, polypropylene, ethylene-vinyl acetate copolymers, ionomer resins, ethylene-ethyl (meth)acrylate copolymers, ethylene-(meth)acrylic acid copolymers, ethylene-propylene copolymers, methyl pentene polymers, polyolefin-based resins obtained by modifying a polyolefin resin such as polyethylene or polypropylene with an unsaturated carboxylic acid such as acrylic acid, methacrylic acid, maleic anhydride, fumaric acid or the like, ethylene-(meth)acrylic acid ester-unsaturated carboxylic acid terpolymer resins, cyclic polyolefin resins, cyclic olefin copolymers, polyethylene terephthalate (PET), polyacrylonitrile (PAN) and other resins, and a film, a sheet, other coating films or the like of one or more of these resins can be used.

As the film or the sheet that forms the resin layer, either a nonoriented film or sheet, or a uniaxially or biaxially stretched oriented film or sheet can be used.

A biaxially stretched oriented film can be obtained by, for example, performing longitudinal stretching at a draw ratio of 2 to 4 by a roll stretching machine at 50 to 100° C., furthermore performing lateral stretching at a draw ratio of 3 to 5 by a stretching machine in a tenter in an atmosphere at 90 to 150° C., and subsequently performing heat treatment in an atmosphere at 100 to 240° C. by the tenter. The oriented film may be one that has been subjected to simultaneous biaxial stretching or sequential biaxial stretching.

Further, the sealant layer (D) may be one that imparts a heat-sealing property, easy openability and functions such as flex resistance and impact resistance to the easily openable gas barrier laminate according to the present invention, and an easily peelable film is used.

In particular, the sealant layer (D) is preferably one that is capable of imparting flex resistance to suppress deterioration of gas barrier properties after bending.

As the easily peelable film, any of an interfacial peeling type, a cohesive peeling type and an interlayer peeling type can be applied, and the easily peelable film can be appropriately selected according to the type and the demand properties of a package.

As an index of easy openability, the sealing strength of the package is preferably in the range of 2 N/15 mm to 20 N/15 mm, and an easily peelable film capable of imparting a sealing strength within the above-mentioned range is used.

In the present invention, materials satisfying conditions as described above can be arbitrarily used.

In the present invention, it is desirable that the sealant layer (D) have a heat-sealable resin layer. The heat-sealable resin layers are thermally melted and welded to each other.

Examples of the resin suitable for the sealant layer (D) include polyethylene, low-density polyethylene, straight chain low-density polyethylene, metallocene polyethylene and nonoriented polypropylene, and a film, a sheet, a coating film or the like of one or more of these resins can be used.

As a layer configuration of the sealant layer (D), a multilayer film of polyethylene/polypropylene+polyethylene/polypropylene is preferred. Further, it is also possible to use a film in which heat-sealable nonoriented polypropylene (CPP), low-density polyethylene or straight chain low-density polyethylene is coated with vapor-deposited aluminum.

If necessary, a known flex resistance improver, inorganic or organic additives and the like can be blended with the above-described resin.

(Thickness of Sealant Layer (D))

The thickness of the sealant layer (D) can be arbitrarily selected within the range of about 5 μm to 500 μm, preferably 10 to 250 μm, more preferably 15 to 100 μm in view of strength and the like as a packaging material. When the thickness is below the above-mentioned range, sufficient laminate strength cannot be obtained by heat-sealing to result in that the resultant fails in functions as a packaging, and also punching resistance or the like is deteriorated. Further, when the thickness is above the above-mentioned range, costs are increased, and the film is hardened, leading to deterioration of workability.

[Gas Barrier Coating Film Layer (E)]

In the present invention, the gas barrier coating film layer (E) can be further provided between the base material layer (A) and the adhesive layer (B) for improving barrier properties against gas such as oxygen gas and water vapor. The gas barrier coating film layer (E) may be provided on the gas barrier vapor-deposited inorganic layer stacked on the base material layer (A).

The gas barrier coating film layer (E) is preferably a layer formed from a resin composition such as a hydrolysate of a metal alkoxide or a hydrolytic condensation product of a metal alkoxide, which is obtained by polycondensation of a mixture of a metal alkoxide and a water-soluble polymer in the presence of a sol-gel process catalyst, water, an organic solvent and the like by a sol-gel process.

As the metal alkoxide, one or more compounds represented by the following general formula can be preferably used.

$$R^1{}_n M(OR^2)_m$$

wherein $R^1$ and $R^2$ each represent an organic group having 1 to 8 carbon atoms, M represents a metal atom, n represents an integer of 0 or more, m represents an integer of 1 or more, and n+m represents an atomic valence of M.

Here, as the metal atom M, silicon, zirconium, titanium, aluminum or the like can be used. Further, specific examples of the organic group represented by $R^1$ and $R^2$ include alkyl groups such as a methyl group, an ethyl group, a n-propyl group, an i-propyl group, a n-butyl group and an i-butyl group. In one molecule, these alkyl groups may be the same or different.

Examples of the metal alkoxide include tetramethoxysilane $Si(OCH_3)_4$, tetraethoxysilane $Si(OC_2H_5)_4$, tetrapropoxysilane $Si(OC_3H_7)_4$, tetrabutoxysilane $Si(OC_4H_9)_4$, and the like, and silane coupling agents having a functional group which is bonded to an organic substance.

The metal alkoxides may be used singly, or in combination of two or more thereof.

As the silane coupling agent, a known organic reactive group-containing organoalkoxysilane can be used. In particular, an organoalkoxysilane having an epoxy group is preferred, and for example, γ-glycidoxypropyltrimethoxysilane, γ-glycidoxypropylmethyldiethoxysilane, β-(3,4-epoxycyclohexyl)ethyltrimethoxysilane or the like.

Silane coupling agents as described above may be used singly, or in combination of two or more thereof. In the present invention, silane coupling agents as described above may be used in an amount of about 1 to 20 parts by mass based on 100 parts by mass of the total of the alkoxides.

As the water-soluble polymer, one or both of a polyvinyl alcohol-based resin and an ethylene-vinyl alcohol copolymer can be preferably used. As these resins, those that are commercially available may be used, and for example, as the ethylene-vinyl alcohol-based copolymer, EVAL EP-F101 (ethylene content: 32 mol %) manufactured by KURARAY CO., LTD., Soarnol D2908 (ethylene content: 29 mol %) manufactured by The Nippon Synthetic Chemical Industry Co., Ltd., or the like can be used.

Further, as the polyvinyl alcohol-based resin, RS-110 (saponification degree=99%, polymerization degree=1,000) which is RS Polymer manufactured by KURARAY CO., LTD., KURARAY POVAL LM-2050 (saponification degree=40%, polymerization degree=2,000) manufactured by KURARAY CO., LTD., Gohsenol NM-14 (saponification degree=99%, polymerization degree=1,400) manufactured by The Nippon Synthetic Chemical Industry Co., Ltd., or the like can be used.

The content of the water-soluble polymer is preferably within the range of 5 to 500 parts by mass based on 100 parts by mass of metal alkoxides. When the content is less than 5 parts by mass, formability of the gas barrier coating film layer (E) tends to be deteriorated, leading to an increase in brittleness, and deterioration of weather resistance and the like, and when the content is more than 500 parts by mass, the gas barrier property improving effect tends to be reduced.

The sol-gel catalyst is preferably an acid or an amine-based compound.

The amine-based compound is preferably a tertiary amine which is substantially insoluble in water and soluble in an organic solvent. Specifically, for example, N,N-dimethylbenzylamine, tripropylamine, tributylamine, tripentylamine or the like can be used. In particular, N,N-dimethylbenzylamine is preferred. Preferably, the content of the amine-based compound is, for example, 0.01 to 1.0 parts by mass, particularly 0.03 to 0.3 parts by mass, based on 100 parts by mass of metal alkoxides. When the content is less than 0.01 parts by mass, the catalytic effect is excessively low, and when the content is more than 1.0 part by mass, unevenness tends to easily occur because the catalytic effect is so strong that the reaction speed is excessively high.

As the acid, for example, mineral acids such as sulfuric acid, hydrochloric acid and nitric acid, organic acids such as acetic acid and tartaric acid, and the like can be used. The content of the acid is preferably 0.001 to 0.05 moles, more preferably 0.01 to 0.03 moles, based on the total molar amount of alkoxy groups of metal alkoxides. When the content is less than 0.001 parts by mass, the catalytic effect is excessively low, and when the content is more than 0.05 parts by mass, unevenness tends to easily occur because the catalytic effect is so strong that the reaction speed is excessively high.

As the organic solvent, methyl alcohol, ethyl alcohol, n-propyl alcohol, isopropyl alcohol, n-butanol or the like can be used. The gas barrier coating film layer (E) is formed by applying a coating solution of the resin composition one or more times by a commonly used method such as roll coating with a gravure roll coater, spray coating, spin coating, dipping, coating with a conventionally known means including a brush, a bar, or an applicator.

A specific example of the method for forming the gas barrier coating film layer (E) will be described below.

First, a metal alkoxide, a water-soluble polymer, a sol-gel process catalyst, water, an organic solvent, and a silane coupling agent and the like if necessary are mixed to prepare a coating solution of a resin composition. In the coating solution, polycondensation reaction gradually proceeds.

Subsequently, by a conventional method, the coating solution is applied onto the gas barrier vapor-deposited inorganic layer stacked on the base material layer (A), and is dried. The drying causes polycondensation of the alkoxide and vinyl alcohol polymer (and silane coupling agent) to further proceed, so that a composite polymer layer is formed. Preferably, the above-described operation can be repeated to stack a plurality of composite polymer layers.

Finally, the laminate coated with the coating solution is heated at a temperature of 20 to 250° C., preferably 50 to 220° C. for 1 second to 10 minutes. In this way, the gas barrier coating film layer (E) can be formed on the gas barrier vapor-deposited inorganic layer.

The gas barrier coating film layer (E) may be a composite polymer layer having one or more layers superposed on one another. Further, the thickness of the gas barrier coating film layer (E) after drying is preferably within the range of 0.01 to 100 μm, more preferably 0.1 to 50 μm. When the thickness after drying is less than 0.01 μm, improvement of gas barrier properties is excessively small, and when the thickness after drying is more than 100 μm, cracks are easily generated.

[Print Layer (F)]

In the easily openable gas barrier laminate according to the present invention, if necessary, the print layer (F) having characters, graphics, symbols or other desired pictures arbitrarily formed by a usual printing method can be provided, for example, between the base material layer (A) and the adhesive layer (B), particularly, for example, between the gas barrier coating film layer (E) and the adhesive layer (B) as shown in FIG. 3.

[Laminate and Packaging Material Formed of the Laminate]

Conventional gas barrier laminate require a long production process, and are complicated because about eight or more layers are necessary in terms of the total number of constituent layers including AC coatings, vapor-deposited metal layers and the like. On the other hand, in the gas barrier laminate according to the present invention, the total number of constituent layers can be smaller as compared to the conventional gas barrier laminates, and gas barrier properties equivalent to or higher than the gas barrier properties of the conventional gas barrier laminates can be exhibited with six or less layers. The total number of constituent layers can also be set to 7 or more, and with a relatively smaller total number of constituent layers as compared to the conventional gas barrier laminates, equivalent or higher gas barrier properties can be exhibited. Further, the total number of constituent layers can be small and the vapor-deposited inorganic layer can be thin, therefore, the process can be shortened and simplified, and the laminate can be made thin, so that the flexibility of the laminate is improved, leading to enhancement of flex resistance.

An easily openable gas barrier laminate and a packaging material formed of the easily openable gas barrier laminate according to the present invention can be produced by laminating the base material layer (A) and the gas barrier vapor-deposited inorganic layer (C) provided on one surface of the sealant layer (D) as in FIG. 4; the surface of the gas barrier coating film layer (E) on the base material layer (A), one surface of which is provided with the gas barrier vapor-deposited inorganic layer and the gas barrier coating film layer (E), and the surface of the gas barrier vapor-deposited inorganic layer (C) provided on one surface of the sealant layer (D) as in FIG. 5; or if necessary, the surface of the print layer (F) of the base material layer (A) provided with the print layer (F) and the surface of the gas barrier vapor-deposited inorganic layer (C) provided on one surface of the sealant layer (D) as in FIG. 6; with the adhesive layer (B) interposed between the layers to be laminated in each case.

A gas barrier laminate and a packaging material formed of the laminate according to the present invention are excellent in gas barrier properties, and have an oxygen permeability of preferably 0.05 to 2.0 cc/m²/day/atm in an environment at 23° C. and 90% RH, and a water vapor permeability of preferably 0.01 to 2.0 g/m²/day/atm in an environment at 40° C. and 90% RH.

In general, when contents are vertical pillow-packed in a packaging bag made of a packaging material, the gas barrier properties of the packaging bag are deteriorated because the packaging bag is exposed to a physical load by heat, friction, pressure and the like. On the other hand, in a packaging bag made of the easily openable gas barrier packaging material according to the present invention, there is a small deterioration in gas barrier properties after vertical pillow packing, and after a packing load is applied once by a vertical pillow packing machine, the oxygen permeability in an environment at 23° C. and 90% RH is larger by preferably 0 or 10.0 cc/m²/day/atm or less than that before the packing load application, and the water vapor permeability in an environment at 40° C. and 90% RH is larger by preferably 0 or 2.0 g/m²/day/atm or less than that before the packing load application.

Further, in general, when contents are vertical pillow-packed in a packaging bag made by subjecting a packaging material to bending processing, heating and pressure bonding, the gas barrier properties of the packaging bag are deteriorated because the packaging bag is exposed to a physical load by heat, friction, pressure and the like. On the other hand, in a packaging bag made of the gas barrier packaging material according to the present invention, there is a small deterioration in gas barrier properties, and after a bending load is applied five times by a Gelbo Flex tester, the oxygen permeability in an environment at 23° C. and 90% RH is larger by preferably 0, or 20.0 cc/m²/day/atm or less, or 10.0 cc/m²/day/atm or less than that before the bending load application.

[Package]

The pillow package according to the present invention is a package obtained by pillow-packaging using the laminate obtained as described above, and is excellent in gas barrier properties, easy openability and flex resistance.

The present invention will be described in detail by way of Examples.

EXAMPLES

Examples: Type 1

[Making Two-Pack Curable Solvent-Free Adhesive A]

A polyester reaction vessel provided with a rectifying column and a water separator was charged with the raw materials described below, the mixture was gradually heated, esterification reaction was caused to proceed under a nitrogen atmosphere while maintaining the liquid temperature of the reaction solution at 220° C. and the vapor temperature at 100° C., the esterification reaction was terminated at the time when the reaction solution had an acid value of 1 mg KOH/g or less, and the solution was cooled to a liquid temperature of 120° C.

Phthalic anhydride: 241.9 parts by mass
Ethylene glycol: 105.4 parts by mass
Glycerin: 75.2 parts by mass
Titanium tetraisopropoxide: 0.042 parts by mass Subsequently, the raw material described below was added to the reaction solution, polycarboxylic acid modification reaction was caused to proceed while the liquid temperature was maintained at 120° C., the esterification reaction was terminated at the time when the acid value became approximately half the acid value calculated from the amount of maleic anhydride added, and the reaction product was cooled to obtain a polycarboxylic acid-modified polyester polyol A.

Maleic anhydride: 77.5 parts by mass

The characteristics of the obtained polycarboxylic acid-modified polyester polyol A are as follows.

Number average molecular weight: about 520
Hydroxyl value: 216.6 mg KOH/g
Acid value: 96.2 mg KOH/g
Number of hydroxyl groups per molecule: 2 (design value)
Number of carboxyl groups per molecule: 1 (design value)

Subsequently, isocyanate compounds which are "DESMODUR N3200" (biuret of hexamethylene diisocyanate; number of isocyanate groups per molecule: 2) manufactured by Sumika Bayer Urethane Co., Ltd. and "TAKENATE 500" (metaxylylene diisocyanate; number of isocyanate groups per molecule: 2) manufactured by Mitsui Chemicals, Incorporated, and the polycarboxylic acid-modified polyester polyol A obtained as described above were heated to 80° C. and uniformly mixed at the blending ration described below, and the mixture was cooled to obtain a two-pack curable solvent-free adhesive A.

Polycarboxylic acid-modified polyester polyol A: 100 parts by mass
DESMODUR N3200: 49.5 parts by mass
TAKENATE 500: 28.9 parts by mass Example 1

A corona-treated surface of a 20 μm OPP (bioriented polypropylene) film corona-treated on one side (P-2171 manufactured by TOYOBO CO., LTD.) as a base material layer and an aluminum-coated surface of a 25 μm CPP (nonoriented polypropylene) film coated with aluminum (thickness: 40 nm) by vapor deposition on one side (2703 manufactured by Toray Advanced Film Co., Ltd.) as a sealant layer were nonsolvent-laminated with the two-pack curable solvent-free adhesive A interposed therebetween.

The amount of the adhesive applied here was such that the adhesive layer had a thickness of 3 μm after curing. After the lamination, aging treatment was performed at 40° C. for 1 day to obtain a laminate. For the obtained laminate, the gas barrier properties, the lamination strength and the solvent content were evaluated. The results are shown in Table 1.

Layer configuration: OPP (20 μm)/solvent-free gas barrier organic adhesive (3 μm)/vapor-deposited aluminum film (40 nm)/CPP (25 μm)

Example 2

Except that as a sealant layer, a 25 μm-thick CPP film (P1128 manufactured by TOYOBO CO., LTD., corona-treated on one side) was coated with alumina (thickness: 20 nm) by vapor deposition on one side, and used instead of the 25 μm-thick CPP film coated with aluminum on one side, the same procedure as in Example 1 was carried out to obtain a laminate, and evaluation was similarly performed. Conditions for coating the film with alumina by vapor deposition on one side are as described below.

Layer configuration: OPP (20 μm)/solvent-free gas barrier organic adhesive (3 μm)/vapor-deposited alumina film (20 nm)/CPP (25 μm)

<Vapor Deposition Conditions>
Vapor deposition surface: corona-treated surface
Degree of vacuum in vacuum chamber: 2 to $6 \times 10^{-6}$ mBar
Degree of vacuum in vapor deposition chamber: 2 to $5 \times 10^{-3}$ mBar
Power supplied to cooling/electrode drum: 10 kW
Line speed: 100 m/min Next, immediately after the vapor-deposited alumina film having a thickness of 200 Å (20 nm) was formed as described above, the surface of the vapor-deposited alumina film was subjected to oxygen/argon mixed gas plasma treatment with a mixed gas of oxygen gas:argon gas=7.0:2.5 (unit: slm) at a power of 9 kw and a mixed gas pressure of $6 \times 10^{-3}$ Torr by a glow discharge plasma generator to form a plasma-treated surface in which the surface tension of the surface of the vapor-deposited alumina film was increased by 54 dyne/cm or more.

Example 3

Except that as a sealant layer, a 25 μm-thick CPP film (P1128 manufactured by TOYOBO CO., LTD., corona-treated on one side) was coated with silicon oxide (thickness: 20 nm) by vapor deposition on one side, and used instead of the 25 μm-thick CPP film coated with aluminum on one side, the same procedure as in Example 1 was carried out to obtain a laminate, and evaluation was similarly performed. Conditions for coating the film with silicon oxide by vapor deposition on one side are as described below.

Layer configuration: OPP (20 μm)/solvent-free gas barrier organic adhesive (3 μm)/vapor-deposited silicon oxide film (20 nm)/CPP (25 μm)

<Vapor Deposition Conditions>
Vapor deposition surface: corona-treated surface
Introduced gas: hexamethyl disiloxane/oxygen gas/helium=1.0/3.0/3.0 (unit: slm)
Degree of vacuum in vacuum chamber: 2 to $6 \times 10^{-6}$ mBar
Degree of vacuum in vapor deposition chamber: 2 to $5 \times 10^{-3}$ mBar
Power supplied to cooling/electrode drum: 10 kW
Line speed: 100 m/min Next, immediately after the vapor-deposited silicon oxide film having a thickness of 200 Å (20 nm) was formed as described above, the surface of the vapor-deposited silicon oxide film was subjected to oxygen/argon mixed gas plasma treatment with a mixed gas of oxygen gas:argon gas=7.0:2.5 (unit: slm) at a power of 9 kw and a mixed gas pressure of $6 \times 10^{-3}$ Torr by a glow discharge plasma generator to form a plasma-treated surface in which the surface tension of the surface of the vapor-deposited silicon oxide film was increased by 54 dyne/cm or more.

Comparative Example 1

Except that the two-pack curable solvent-free adhesive A was replaced by a two-pack curable urethane adhesive (TOMOFLEX TM-340 manufactured by Toyo-Morton, Ltd./CAT-29 manufactured by Toyo-Morton, Ltd.), and aging was performed at 25° C. for 1 day, the same procedure as in Example 1 was carried out to obtain a laminate, and evaluation was similarly performed.

Layer configuration: OPP (20 μm)/two-pack curable urethane adhesive (3 μm)/vapor-deposited aluminum film (40 nm)/CPP (25 μm)

Comparative Example 2

A multilayer film of polyethylene/polypropylene+polyethylene/polypropylene was formed to obtain a 25 μm-thick easily peelable CPP film.

Further, using a winding-type vacuum vapor deposition machine, the obtained easily peelable CPP film was coated with aluminum by vapor deposition at $5\times10^{-4}$ Torr by inductive heating of aluminum to obtain as a gas barrier vapor-deposited inorganic layer (C) a 25 μm-thick easily peelable CPP (nonoriented polypropylene) film A having a 40 nm-thick vapor-deposited aluminum layer on one side.

An AC coating (P-1000 manufactured by DICG Company, applied coating, thickness after drying: 3 g/m$^2$) was applied to a corona-treated surface of a 20 μm OPP (biaxially oriented polypropylene) film corona-treated on one side (P-2171 manufactured by TOYOBO CO., LTD.), and the AC coating surface and an aluminum-coated surface of a 12 μm PET film (biaxially oriented PET film E-5100 manufactured by TOYOBO CO., LTD.; thickness: 12 μm; corona-treated on one side) coated with aluminum by vapor deposition on one side under the vapor deposition conditions described below were laminated by extrusion lamination with low-density polyethylene (LC 600A manufactured by Japan Polyethylene Corporation) interposed therebetween. The thickness of the polyethylene was adjusted to 7 μm.

Subsequently, an AC coating was applied to a noncoated surface of the laminated aluminum-coated PET film, and the AC coating surface and the 25 μm easily peelable CPP film A having easy openability were laminated by extrusion lamination with low-density polyethylene (LC 600A manufactured by Japan Polyethylene Corporation) interposed therebetween. The thickness of the polyethylene was adjusted to 7 μm. After the lamination, aging treatment was performed at 25° C. for 1 day to obtain a laminate, and evaluation was similarly performed.

Layer configuration: OPP (20 μm)/AC coating/PE (7 μm)/vapor-deposited aluminum film (40 nm)/PET (12 μm)/AC coating/PE (7 μm)/CPP (25 μm)

<Vapor Deposition Conditions>

Vapor deposition surface: corona-treated surface

Degree of vacuum in vacuum chamber: 2 to $6\times10^{-6}$ mBar

Degree of vacuum in vapor deposition chamber: 2 to $5\times10^{-3}$ mBar

Power supplied to cooling/electrode drum: 10 kW

Line speed: 100 m/min

Next, immediately after the vapor-deposited aluminum film having a thickness of 400 Å (40 nm) was formed as described above, the surface of the vapor-deposited aluminum film was subjected to oxygen/argon mixed gas plasma treatment with a mixed gas of oxygen gas:argon gas=7.0:2.5 (unit: slm) at a power of 9 kw and a mixed gas pressure of $6\times10^{-3}$ Torr by a glow discharge plasma generator to form a plasma-treated surface in which the surface tension of the surface of the vapor-deposited aluminum film was increased by 54 dyne/cm or more.

Comparative Example 3

Except that the solvent-free gas barrier organic adhesive was replaced by the solvent-containing gas barrier organic adhesive described below, the same procedure as in Example 1 was carried out to obtain a laminate, and evaluation was similarly performed.

Layer configuration: OPP (20 μm)/solvent-containing gas barrier organic adhesive (3 μm)/vapor-deposited aluminum film (40 nm)/CPP (25 μm)

(Preparation of Solvent-Containing Gas Barrier Organic Adhesive)

The adhesive and solvent described below were mixed to prepare a solvent-containing gas barrier organic adhesive.

Adhesive: 19 parts by mass of PASLIM VM001/VM102 CP (manufactured by DIC Corporation)

Solvent: 15 parts by mass of ethyl acetate

<Evaluation>

[Lamination Properties]

From the laminate obtained in each of Examples and Comparative Examples, a test piece was cut out in the form of a strip having a width of 15 mm. The maximum load at the time of delaminating the test piece between the base material layer and the sealant layer by a T-shaped delamination method (tensile speed: 50 mm/min) in an atmosphere at 25° C. using a Tensilon tensile tester (RTC-1310A manufactured by ORIENTEC CORPORATION) was measured, and defined as a lamination strength (N/15 mm). Further, a delaminated interface portion was examined. Expressions in Table 1 have the meanings described below.

VM/CPP: delaminated at the interface between the vapor-deposited layer and the CPP layer.

PE/VM: delaminated at the interface between the polyethylene layer and the vapor-deposited layer.

Adhesive/VM: delaminated at the interface between the adhesive layer and the vapor-deposited layer.

[Gas Barrier Properties]

(1) Oxygen Permeability

Each laminate was cut to the A4 size, and using OXTRAN 2/20 manufactured by MOCON, Inc. (United States), the oxygen permeability (cc/m$^2$/day/atm) was measured at 23° C. and 90% RH.

(2) Water Vapor Permeability

Each laminate was cut to the A4 size, and using PERMATRAN 3/31 manufactured by MOCON, Inc. (United States), the water vapor permeability (g/m$^2$/day/atm) was measured at 40° C. and 90% RH.

(3) After Application of Bending Load

After a bending load was applied five times by a Gelbo Flex tester, the oxygen permeability was measured by the same method and under the same conditions as described above.

[Solvent Content]

The total amount (mg/m$^2$) of toluene, ethyl acetate, IPA, methanol and MEK in the film was measured by a DNP method. A test piece was rated acceptable when the total amount of solvents was 0 or 6 mg/m$^2$ or less.

TABLE 1

| | Types | Details | Unit | Examples 1 | Examples 2 | Examples 3 | Comparative Examples 1 | Comparative Examples 2 | Comparative Examples 3 |
|---|---|---|---|---|---|---|---|---|---|
| Layer configuration of laminate | Base material layer | OPP (with corona-treated lower surface) | μm | 20 | 20 | 20 | 20 | 20 | 20 |
| | | AC Coating | g/m2 | | | | | | |
| | Adhesive layer | Two-pack curable solvent-free adhesive agent A | μm | 3 | 3 | 3 | | | |
| | | Two-Pack curable urethane adhesive | μm | | | | 3 | | |
| | | Polyethylene | μm | | | | | 3 | |
| | | Solvent-containing gas barrier organic adhesive | μm | | | | | | 3 |
| | Sealant layer | Vapor-deposited layer (aluminum, alumina or silicon oxide) | nm | 40 | 20 | 20 | 40 | 40 | 40 |
| | | CPP (with upper surface coated with aluminum by vapor deposition) | μm | 25 | | | 25 | | 25 |
| | | CPP (with upper surface coated with alumina by vapor deposition) | μm | | 25 | | | | |
| | | CPP (with upper surface coated with silicon oxide by vapor deposition) | μm | | | 25 | | | |
| | | PET (with upper surface coated with aluminum by vapor deposition) | μm | | | | | 12 | |
| | | AC Coating | g/m2 | | | | | 3 | |
| | | Polyethylene | μm | | | | | 7 | |
| | | Easily peelable CPP film A (easily openable) | μm | | | | | 25 | |
| | Aging conditions | | — | 40° C. for 1 day | 40° C. for 1 day | 40° C. for 1 day | 25° C. for 1 day | 25° C. for 1 day | 40° C. for 1 day |
| Evaluation results | Gas barrier properties (23° C.90% RH) | Oxygen permeability Before Gelbo treatment | cc/m2/day/atm | 0.55 | 0.68 | 0.69 | 4.58 | 0.56 | 0.32 |
| | | After Gelbo treatment five times | cc/m2/day/atm | 6.40 | 10.80 | 11.20 | 29.20 | 6.83 | 7.50 |
| | | Increase from value before Gelbo treatment | cc/m2/day/atm | 5.85 | 10.12 | 10.51 | 24.62 | 6.27 | 7.18 |
| | Water vapor permeability (40° C.90% RH) | Before Gelbo treatment | g/m2/day/atm | 0.22 | 0.25 | 0.34 | 0.51 | 0.42 | 0.15 |
| | Lamination properties | Strength | N/15 mm | 1.61 | 1.55 | 1.53 | 1.64 | 2.02 | 1.33 |
| | | Delaminated interface | — | VM/CPP | VM/CPP | VM/CPP | VM/CPP | PE/VM | Adhesive/VM |
| | Solvent content of adhesive layer | | mg/m2 | 0.5 | 0.5 | 0.5 | 4.2 | 1.1 | 6.8 |

[Summary of Results]

The laminates of Examples 1 to 3 in which the solvent-free gas barrier organic adhesive layer (B) had a lamination strength comparable to that of the laminate of Comparative Example 1 using a conventional two-pack curable urethane adhesive, and higher than that of the laminates of each of Comparative Examples 2 and 3, and was superior in gas barrier properties after bending to the conventional laminate of each of Comparative Examples 1 and 2, and the laminate of Comparative Example 3 using a solvent-containing gas barrier adhesive.

Examples: Type 2

(Preparation of Adhesive Resin Composition)

The adhesive and solvent described below were mixed to prepare an adhesive resin composition (a).

Adhesive: 19 parts by mass of PASLIM VM001/VM102CP (manufactured by DIC Corporation)

Solvent: 15 parts by mass of ethyl acetate (Making Easily Peelable CPP Coated with Aluminum by Vapor Deposition)

Subsequently, a multilayer film of polyethylene/polypropylene+polyethylene/polypropylene was formed to obtain a 25 μm-thick easily peelable CPP film.

Further, using a winding-type vacuum vapor deposition machine, the obtained easily peelable CPP film was coated with aluminum by vapor deposition at $5 \times 10^{-4}$ Torr by inductive heating of aluminum to obtain as a gas barrier vapor-deposited inorganic layer (C) a 25 μm-thick easily peelable CPP (nonoriented polypropylene) film A having a 40 nm-thick vapor-deposited aluminum layer on one side.

Example 4

A corona-treated surface of a 20 μm OPP (bioriented polypropylene) film corona-treated on one side (P-2171 manufactured by TOYOBO CO., LTD.) as a base material layer (A) and an aluminum-coated surface of the easily peelable CPP film A coated with aluminum by vapor deposition on one side, as a sealant layer (D), were dry-laminated with the adhesive resin composition (a) as a gas barrier adhesive layer (B) interposed therebetween.

The amount of the adhesive resin composition (a) applied here was such that the adhesive layer had a thickness of 3 μm after curing. After the lamination, aging treatment was performed at 40° C. for 3 days to obtain a laminate. For the obtained laminate, a vertical pillow packing test was conducted, and the gas barrier properties, the lamination strength and the packaging material sealing strength were evaluated. The results are shown in Table 2.

Layer configuration: OPP (20 μm)/gas barrier adhesive (3 μm)/vapor-deposited aluminum film (40 nm)/CPP (25 μm)

Examples 5 to 8

Except that the thickness of the adhesive resin composition (a) was changed to a value (1.1, 2.2, 3.3 or 4.4 μm) in Table 2, the same procedure as in Example 4 was carried out to make a laminate, and gas barrier propertied were evaluated.

Layer configuration in Example 5: OPP (20 μm)/gas barrier adhesive (1.1 μm)/vapor-deposited aluminum film (40 nm)/CPP (25 μm)

Layer configuration in Example 6: OPP (20 μm)/gas barrier adhesive (2.2 μm)/vapor-deposited aluminum film (40 nm)/CPP (25 μm)

Layer configuration in Example 7: OPP (20 μm)/gas barrier adhesive (3.3 μm)/vapor-deposited aluminum film (40 nm)/CPP (25 μm)

Layer configuration in Example 8: OPP (20 μm)/gas barrier adhesive (4.4 μm)/vapor-deposited aluminum film (40 nm)/CPP (25 μm)

Example 9

The raw materials described below were mixed to prepare a gas barrier coating film resin composition (b) for a gas barrier coating film layer (E).
Tetraethoxysilane: 100 parts by mass
Eval EP-F101: 20 parts by mass
N,N-dimethylbenzylamine: 0.2 parts by mass
Isopropyl alcohol: 300 parts by mass Using a winding-type vacuum vapor deposition machine, a corona-treated surface of a 20 μm OPP (bioriented polypropylene) film corona-treated on one side (P-2171 manufactured by TOYOBO CO., LTD.) as a base material layer (A) was coated with aluminum by vapor deposition at $5 \times 10^{-4}$ Torr by inductive heating of aluminum to obtain as a gas barrier vapor-deposited inorganic layer a 20 μm-thick OPP film B having a 40 nm-thick vapor-deposited aluminum layer on one side.

Subsequently, the gas barrier coating film resin composition (b) was applied to the surface of the gas barrier vapor-deposited inorganic layer of the OPP film B in such a manner as to have a thickness of 2 μm after drying, and heated and dried at 90° C. for 5 minutes to form a gas barrier coating film layer (E).

The surface of the gas barrier coating film layer (E) and the surface of the aluminum-coated surface of an easily peelable CPP film A coated with aluminum by vapor deposition on one side, as a sealant layer (D), were dry-laminated with an adhesive resin composition (a) as a gas barrier adhesive layer (B) interposed therebetween.

The amount of the adhesive resin composition (a) applied here was such that the adhesive layer (B) had a thickness of 3 μm after curing. After the lamination, aging treatment was performed at 40° C. for 3 days to obtain a laminate. For the obtained laminate, a vertical pillow packing test was conducted, and the gas barrier properties, the lamination strength and the packaging material sealing strength were evaluated. The results are shown in Table 2.

Layer configuration: OPP (20 μm)/vapor-deposited aluminum film (40 nm)/gas barrier coating film (2 μm)/gas barrier adhesive (3 μm)/vapor-deposited aluminum film (40 nm)/CPP (25 μm)

Comparative Example 4

A corona-treated surface of a 20 μm OPP film corona-treated on one side (P-2171 manufactured by TOYOBO CO., LTD.) as a base material layer (A) and an aluminum-coated surface of a 25 μm CPP film coated with aluminum (thickness: 40 nm) by vapor deposition on one side (2703 manufactured by Toray Advanced Film Co., Ltd.) as a sealant layer were dry-laminated with a two-pack curable urethane adhesive (TOMOFLEX TM-340 manufactured by Toyo-Morton, Ltd./CAT-29 manufactured by Toyo-Morton, Ltd.) interposed therebetween.

The amount of the adhesive applied here was such that the adhesive layer had a thickness of 3 μm after curing. After the lamination, aging treatment was performed at 25° C. for 1 day to obtain a laminate. For the obtained laminate, the gas barrier properties, the lamination strength and the solvent content were evaluated. The results are shown in Table 2.

Layer configuration: OPP (20 μm)/two-pack curable urethane adhesive (3 μm)/vapor-deposited aluminum layer (40 nm)/CPP (25 μm)

Comparative Example 5

A corona-treated surface of a 20 μm OPP film corona-treated on one side (P-2171 manufactured by TOYOBO CO., LTD.) as a base material layer and an aluminum-coated surface of a 12 μm PET film coated with aluminum (thickness: 40 nm) by vapor deposition on one side (1310 manufactured by Toray Advanced Film Co., Ltd.) as a sealant layer were dry-laminated with a two-pack curable urethane adhesive (TOMOFLEX TM-340 manufactured by Toyo-Morton, Ltd./CAT-29 manufactured by Toyo-Morton, Ltd.) interposed therebetween.

The amount of the adhesive applied here was such that the adhesive layer had a thickness of 3 μm after curing. Subsequently, the noncoated surface of the laminated PET film and a corona-treated surface of a CPP film corona-treated on one side (P-1128 manufactured by TOYOBO CO., LTD.) were dry-laminated with a two-pack curable urethane adhesive (TOMOFLEX TM-340 manufactured by Toyo-Morton, Ltd./CAT-29 manufactured by Toyo-Morton, Ltd.) interposed therebetween. After the lamination, aging treatment was performed at 25° C. for 1 day to obtain a laminate. For the obtained laminate, the gas barrier properties, the lamination strength and the solvent content were evaluated. The results are shown in Table 2.

Layer configuration: OPP (20 μm)/two-pack curable urethane adhesive (3 μm)/vapor-deposited aluminum layer (40 nm)/PET (12 μm)/two-pack curable urethane adhesive (3 μm)/CPP (25 μm)

Comparative Example 6

An AC coating (P-1000 manufactured by DICG Company, applied coating, thickness after drying: 3 g/m²) was applied to a corona-treated surface of a 20 μm OPP film corona-treated on one side (P-2171 manufactured by TOYOBO CO., LTD.) as a base material layer, and the AC coating and an aluminum-coated surface of a 12 μm PET film coated with aluminum by vapor deposition (thickness: 40 nm) on one side (1310 manufactured by Toray Advanced Film Co., Ltd.) were laminated by extrusion lamination with low-density polyethylene (LC 600A manufactured by Japan Polyethylene Corporation) interposed therebetween. The thickness of the polyethylene was adjusted to 7 μm.

Subsequently, an AC coating was applied to the noncoated surface of the laminated aluminum-coated PET film, and the AC coating surface and a 18 μm CPP film (TAF-513 manufactured by Mitsui Chemicals Tohcello Inc.) having easy openability were laminated by extrusion lamination with low-density polyethylene (LC 600A manufactured by Japan Polyethylene Corporation) interposed therebetween. The thickness of the polyethylene was adjusted to 7 μm. After the lamination, aging treatment was performed at 25°

C. for 1 day to obtain a laminate which is a conventional gas barrier laminate, and evaluation was similarly performed.

Layer configuration: OPP (20 μm)/AC coating/PE (7 μm)/vapor-deposited aluminum film (40 nm)/PET (12 μm)/AC coating/PE (7 μm)/CPP (18 μm)

Comparative Example 7

Except that the thickness of the adhesive layer (B) after curing was changed to a thickness (0.55 μm) as described in Table 2, the same procedure as in Example 7 was carried out to make a laminate, and the gas barrier properties were evaluated.

Layer configuration: OPP (20 μm)/gas barrier adhesive (0.55 μm)/vapor-deposited aluminum film (40 nm)/CPP (25 μm)

<Evaluation>

[Vertical Pillow Packing Properties]

Using an empty bag with no contents, the vertical pillow packing properties were evaluated under the conditions described below.

Packing machine: KBF-6100 (manufactured by Kawashima Manufacturing Co., Ltd.)

Packaging bag size: 200 mm (width)×240 mm (height)

Sealing conditions: vertical sealing at 140° C. and horizontal sealing at 150° C.

Number of shots: 30/min

[Gas Barrier Properties]

(1) Oxygen Permeability

Each laminate was cut to the A4 size, and using OXTRAN 2/20 manufactured by MOCON, Inc. (United States), the oxygen permeability (cc/m²/day/atm) was measured at 23° C. and 90% RH.

(2) Water Vapor Permeability

Each laminate was cut to the A4 size, and using PERMATRAN 3/31 manufactured by MOCON, Inc. (United States), the water vapor permeability (g/m²/day/atm) was measured at 40° C. and 90% RH.

(3) After Vertical Pillow Packing

After a packing test for each laminate was conducted using the vertical pillow packing machine, the oxygen permeability and the water vapor permeability were measured by the same method and under the same conditions as described above.

[Lamination Properties]

From the laminate obtained in each of Examples and Comparative Examples, a test piece was cut out in the form of a strip having a width of 15 mm. The maximum load at the time of delaminating the test piece between the base material layer and the sealant layer by a T-shaped delamination method (tensile speed: 50 mm/min) in an atmosphere at 25° C. using a Tensilon tensile tester (RTC-1310A manufactured by ORIENTEC CORPORATION) was measured, and defined as a lamination strength (N/15 mm). Further, a delaminated interface portion was examined. Expressions in Table 2 have the meanings described below. A test piece having a lamination strength of 1 N/15 mm or more was rated acceptable.

VM/CPP: delaminated at the interface between the vapor-deposited aluminum layer and the CPP layer.

PE/VM: delaminated at the interface between the polyethylene layer and the vapor-deposited aluminum layer.

Adhesive/VM: delaminated at the interface between the adhesive layer and the vapor-deposited aluminum layer.

[Packaging Material Sealing Strength]

From the laminate obtained in each of Examples and Comparative Examples, a test piece was cut out in the form of a strip having a width of 15 mm. The maximum load at the time of delaminating the test piece at the sealant layer by a T-shaped delamination method (tensile speed: 50 mm/min) in an atmosphere at 25° C. using a Tensilon tensile tester (RTC-1310A manufactured by ORIENTEC CORPORATION) was measured, and defined as a packaging material sealing strength (N/15 mm). A test piece having a sealing strength of 2 to 20 N/15 mm was rated acceptable.

TABLE 2

| | | | | Examples | | | | | | Comparative Examples | | | |
|---|---|---|---|---|---|---|---|---|---|---|---|---|---|
| Types | Details | Unit | | 4 | 5 | 6 | 7 | 8 | 9 | 4 | 5 | 6 | 7 |
| Layer configuration of laminate | | | | | | | | | | | | | |
| Base material layer | CPP film A (with corona-treated lower surface) | μm | | 20 | 20 | 20 | 20 | 20 | | 20 | 20 | 20 | 20 |
| | CPP film B (with lower surface coated with aluminum by vapor deposition (40 nm)) | μm | | | | | | | 20 | | | | |
| | AC Coating | g/m2 | | | | | | | | | | 1 | |
| Gas barrier coating film | Gas barrier coating film resin composition (b) | μm | | | | | | | 2.0 | | | | 0.55 |
| Adhesive layer | Two-pack curable urethane adhesive | μm | | 3.0 | 1.1 | 2.2 | 3.3 | 4.4 | 3.0 | 3.0 | 3.0 | | |
| | Polyethylene | μm | | | | | | | | | | 7.0 | |
| Base material layer | Vapor-deposited layer (aluminum) | nm | | | | | | | | | 40 | 40 | |
| | PET (with upper surface coated with aluminum by vapor deposition) | nm | | | | | | | | | 12 | 12 | |
| | AC Coating | g/m2 | | | | | | | | | | 1 | |
| Adhesive layer | Two-pack curable urethane adhesive | μm | | | | | | | | | 3.0 | | |
| | Polyethylene | μm | | | | | | | | | | 7.0 | |
| Sealant layer | Easily peelable CPP film A (with upper surface coated with aluminum by vapor deposition (40 nm)) | μm | | 25 | 25 | 25 | 25 | 25 | 25 | | 25 | | 25 |
| | Easily peelable CPP | μm | | | | | | | | | | | |
| | CPP (with upper surface coated with aluminum by vapor deposition (40 nm)) | μm | | | | | | | | 25 | | | |
| | CPP (with corona-treated upper surface) | μm | | | | | | | | | | 18 | |
| Total number of constituent layers | | layers | | 4 | 4 | 4 | 4 | 4 | 6 | 4 | 6 | 8 | 4 |
| Aging conditions | | — | | 40° C. for 3 days | 40° C. for 3 days | 40° C. for 3 days | 40° C. for 3 days | 40° C. for 3 days | 40° C. for 3 days | 25° C. for 1 day | 25° C. for 1 day | 25° C. for 1 day | 40° C. for 3 days |
| Evaluation results | | | | | | | | | | | | | |
| Gas barrier properties | Oxygen permeability (23° C.90% RH) | Before packing | cc/m2/day/atm | 0.25 | 1.13 | 0.50 | 0.31 | 0.20 | 0.17 | 4.12 | 1.21 | 1.01 | 11.20 |
| | | After packing | cc/m2/day/atm | 0.38 | 3.67 | 0.65 | 0.46 | 0.32 | 0.28 | 120.00 | 15.40 | 3.15 | N.D. |
| | | Increase from value before packing | cc/m2/day/atm | 0.13 | 2.54 | 0.15 | 0.15 | 0.12 | 0.11 | 115.88 | 14.19 | 2.14 | N.D. |
| | Water vapor permeability (40° C.90% RH) | Before packing | g/m2/day/atm | 0.11 | 0.12 | 0.10 | 0.10 | 0.10 | 0.08 | 0.51 | 0.51 | 0.42 | 1.10 |
| | | After packing | g/m2/day/atm | 0.15 | 0.17 | 0.15 | 0.14 | 0.14 | 0.11 | 0.65 | 0.50 | 0.51 | N.D. |
| | | Increase from value before packing | g/m2/day/atm | 0.04 | 0.05 | 0.05 | 0.04 | 0.04 | 0.02 | 0.14 | 0.09 | 0.10 | N.D. |
| Lamination properties | Vertical pillow packing test | | — | Good | Good | Good | Good | Good | Good | Good | Good | Good | N.D. |
| | Strength | | N/15 mm | 1.58 | 1.24 | 1.34 | 1.51 | 1.67 | 1.55 | 1.81 | 1.96 | 0.95 | N.D. |
| | Delaminated interface | | — | VM/CPP | VM/CPP | VM/CPP | VM/CPP | VM/CPP | VM/CPP | VM/CPP | Adhesive/ | PE/VM VMPET | N.D. |
| | Sealing strength of packaging material | | N/15 mm | 12.5 | 10.1 | 11.5 | 12.8 | 13.4 | 12.6 | 15.4 | 35.0 | 10.8 | N.D. |

[Summary of Results]

In Examples 4 to 9, the total number of constituent layers was 4 to 6, but the vertical pillow packing properties, the oxygen permeability before and after packing, the water vapor permeability before and after packing, the lamination strength, the delaminated interface and the packaging material sealing strength were well balanced, and the gas barrier properties were equivalent to or higher than those of the conventional gas barrier laminate of Comparative Example 6 in which the total number of constituent layers was 8.

On the other hand, in Comparative Examples 4 and 5 where the gas barrier adhesive layer (B) and the easily openable sealant layer (D) were not present, the oxygen permeability before packing and/or the amount of increase in oxygen permeability after packing were high, and in Comparative Example 5, the packaging material sealing strength was excessively high, resulting in poor easy openability. In the conventional gas barrier laminate of Comparative Example 6, the total number of constituent layers was 8, and larger as compared to Examples, and therefore gas barrier properties equivalent to those in Examples were exhibited. In Comparative Example 7 where the gas barrier adhesive layer (B) had an excessively small thickness, the oxygen permeability before packing was not adequate, and therefore subsequent evaluation was not performed.

Examples: Type 3

[Making Two-Pack Curable Solvent-Free Adhesive A]

A polyester reaction vessel provided with a rectifying tube and a water separator was charged with the raw materials described below, the mixture was gradually heated, esterification reaction was caused to proceed while the liquid temperature of the reaction solution was maintained at 220° C. and the vapor temperature was maintained at 100° C. under a nitrogen atmosphere, the esterification reaction was terminated at the time when the reaction solution had an acid value of 1 mg KOH/g or less, and the solution was cooled to a liquid temperature of 120° C.

Phthalic anhydride: 241.9 parts by mass
Ethylene glycol: 105.4 parts by mass
Glycerin: 75.2 parts by mass
Titanium tetraisopropoxide: 0.042 parts by mass Subsequently, the raw material described below was added to the reaction solution, polycarboxylic acid modification reaction was caused to proceed while the liquid temperature was maintained at 120° C., the esterification reaction was terminated at the time when the acid value became approximately half the acid value calculated from the amount of maleic anhydride added, and the reaction product was cooled to obtain a polycarboxylic acid-modified polyester polyol A.

Maleic anhydride: 77.5 parts by mass

The characteristics of the obtained polycarboxylic acid-modified polyester polyol A are as follows.

Number average molecular weight: about 520
Hydroxyl value: 216.6 mg KOH/g
Acid value: 96.2 mg KOH/g
Number of hydroxyl groups per molecule: 2 (design value)
Number of carboxyl groups per molecule: 1 (design value)

Subsequently, isocyanate compounds which are "DESMODUR N3200" (biuret of hexamethylene diisocyanate; number of isocyanate groups per molecule: 2) manufactured by Sumika Bayer Urethane Co., Ltd. and "TAKENATE 500" (metaxylylene diisocyanate; number of isocyanate groups per molecule: 2) manufactured by Mitsui Chemicals, Incorporated, and the polycarboxylic acid-modified polyester polyol A obtained as described above were heated to 80° C. and uniformly mixed at the blending ration described below, and the mixture was cooled to obtain a two-pack curable solvent-free adhesive A.

Polycarboxylic acid-modified polyester polyol A: 100 parts by mass
DESMODUR N3200: 49.5 parts by mass]
TAKENATE 500: 28.9 parts by mass Example 10

A corona-treated surface of a 20 μm OPP (bioriented polypropylene) film corona-treated on one side (P-2171 manufactured by TOYOBO CO., LTD.) as a base material layer and an aluminum-coated surface of a 25 μm CPP (nonoriented polypropylene) film coated with aluminum (thickness: 40 nm) by vapor deposition on one side (2703 manufactured by Toray Advanced Film Co., Ltd.) as a sealant layer were nonsolvent-laminated with the two-pack curable solvent-free adhesive A interposed therebetween. The amount of the adhesive applied here was such that the adhesive layer had a thickness of 3 μm after curing. After the lamination, aging treatment was performed at 40° C. for 3 days to obtain a laminate. For the obtained laminate, the gas barrier properties, the lamination strength and the solvent content were evaluated. The results are shown in Table 3.

Layer configuration: OPP (20 μm)/solvent-free gas barrier organic adhesive (3 μm)/vapor-deposited aluminum film (40 nm)/CPP (25 μm)

Example 11

Except that as a sealant layer, a 25 μm-thick CPP film (P1128 manufactured by TOYOBO CO., LTD., corona-treated on one side) was coated with alumina (thickness: 20 nm) by vapor deposition on one side, and used instead of the 25 μm-thick CPP film coated with aluminum on one side, the same procedure as in Example 10 was carried out to obtain a laminate, and evaluation was similarly performed. Conditions for coating the film with alumina by vapor deposition on one side are as described below.

Layer configuration: OPP (20 μm)/solvent-free gas barrier organic adhesive (3 μm)/vapor-deposited alumina film (20 nm)/CPP (25 μm)

<Vapor Deposition Conditions>
Vapor deposition surface: corona-treated surface
Degree of vacuum in vacuum chamber: 2 to $6 \times 10^{-6}$ mBar
Degree of vacuum in vapor deposition chamber: 2 to $5 \times 10^{-3}$ mBar
Power supplied to cooling/electrode drum: 10 kW
Line speed: 100 m/min Next, immediately after the vapor-deposited alumina film having a thickness of 200 Å (20 nm) was formed as described above, the surface of the vapor-deposited alumina film was subjected to oxygen/argon mixed gas plasma treatment with a mixed gas of oxygen gas:argon gas=7.0:2.5 (unit: slm) at a power of 9 kw and a mixed gas pressure of $6 \times 10^{-3}$ Torr by a glow discharge plasma generator to form a plasma-treated surface in which the surface tension of the surface of the vapor-deposited alumina film was increased by 54 dyne/cm or more.

Example 12

Except that as a sealant layer, a 25 μm-thick CPP film (P1128 manufactured by TOYOBO CO., LTD., corona-treated on one side) was coated with silicon oxide (thickness: 20 nm) by vapor deposition on one side, and used instead of the 25 μm-thick CPP film coated with aluminum on one side, the same procedure as in Example 10 was carried out to obtain a laminate, and evaluation was similarly performed. Conditions for coating the film with silicon oxide by vapor deposition on one side are as described below.

Layer configuration: OPP (20 μm)/solvent-free gas barrier organic adhesive (3 μm)/vapor-deposited silicon oxide film (20 nm)/CPP (25 μm)
<Vapor Deposition Conditions>
Vapor deposition surface: corona-treated surface
Introduced gas: hexamethyl disiloxane/oxygen gas/helium=1.0/3.0/3.0 (unit: slm)
Degree of vacuum in vacuum chamber: 2 to 6×10⁻⁶ mBar
Degree of vacuum in vapor deposition chamber: 2 to 5×10⁻³ mBar
Power supplied to cooling/electrode drum: 10 kW
Line speed: 100 m/min Next, immediately after the vapor-deposited silicon oxide film having a thickness of 200 Å (20 nm) was formed as described above, the surface of the vapor-deposited silicon oxide film was subjected to oxygen/argon mixed gas plasma treatment with a mixed gas of oxygen gas:argon gas=7.0:2.5 (unit: slm) at a power of 9 kw and a mixed gas pressure of 6×10⁻³ Torr by a glow discharge plasma generator to form a plasma-treated surface in which the surface tension of the surface of the vapor-deposited silicon oxide film was increased by 54 dyne/cm or more.

Comparative Example 8

Except that the two-pack curable solvent-free adhesive A was replaced by a two-pack curable urethane adhesive (TOMOFLEX TM-340 manufactured by Toyo-Morton, Ltd./CAT-29 manufactured by Toyo-Morton, Ltd.), and aging was performed at 25° C. for 1 day, the same procedure as in Example 10 was carried out to obtain a laminate, and evaluation was similarly performed.

Layer configuration: OPP (20 μm)/two-pack curable urethane adhesive (3 μm)/vapor-deposited aluminum film (40 nm)/CPP (25 μm)

Comparative Example 9

A multilayer film of polyethylene/polypropylene+polyethylene/polypropylene was formed to obtain a 25 μm-thick easily peelable CPP film.

Further, using a winding-type vacuum vapor deposition machine, the obtained easily peelable CPP film was coated with aluminum by vapor deposition at 5×10⁻⁴ Torr by inductive heating of aluminum to obtain as a gas barrier vapor-deposited inorganic layer (C) a 25 μm-thick easily peelable CPP (nonoriented polypropylene) film A having a 40 nm-thick vapor-deposited aluminum layer on one side.

An AC coating (P-1000 manufactured by DICG Company, applied coating, thickness after drying: 3 g/m²) was applied to a corona-treated surface of a 20 μm OPP (biaxially oriented polypropylene) film corona-treated on one side (P-2171 manufactured by TOYOBO CO., LTD.), and the AC coating surface and an aluminum-coated surface of a 12 μm PET film (biaxially oriented PET film E-5100 manufactured by TOYOBO CO., LTD.; thickness: 12 μm; corona-treated on one side) coated with aluminum by vapor deposition on one side under the vapor deposition conditions described below were laminated by extrusion lamination with low-density polyethylene (LC 600A manufactured by Japan Polyethylene Corporation) interposed therebetween. The thickness of the polyethylene was adjusted to 7 μm.

Subsequently, an AC coating was applied to a noncoated surface of the laminated aluminum-coated PET film, and the AC coating surface and the 25 μm easily peelable CPP film A having easy openability were laminated by extrusion lamination with low-density polyethylene (LC 600A manufactured by Japan Polyethylene Corporation) interposed therebetween. The thickness of the polyethylene was adjusted to 7 μm. After the lamination, aging treatment was performed at 25° C. for 1 day to obtain a laminate, and evaluation was similarly performed.

Layer configuration: OPP (20 μm)/AC coating/PE (7 μm)/vapor-deposited aluminum film (40 nm)/PET (12 μm)/AC coating/PE (7 μm)/CPP (25 μm)
<Vapor Deposition Conditions>
Vapor deposition surface: corona-treated surface
Degree of vacuum in vacuum chamber: 2 to 6×10⁻⁶ mBar
Degree of vacuum in vapor deposition chamber: 2 to 5×10⁻³ mBar
Power supplied to cooling/electrode drum: 10 kW
Line speed: 100 m/min Next, immediately after the vapor-deposited aluminum film having a thickness of 400 Å (40 nm) was formed as described above, the surface of the vapor-deposited aluminum film was subjected to oxygen/argon mixed gas plasma treatment with a mixed gas of oxygen gas:argon gas=7.0:2.5 (unit: slm) at a power of 9 kw and a mixed gas pressure of 6×10⁻³ Torr by a glow discharge plasma generator to form a plasma-treated surface in which the surface tension of the surface of the vapor-deposited aluminum film was increased by 54 dyne/cm or more.

Comparative Example 10

Except that the solvent-free gas barrier organic adhesive was replaced by the solvent-containing gas barrier organic adhesive described below, the same procedure as in Example 10 was carried out to obtain a laminate, and evaluation was similarly performed.

Layer configuration: OPP (20 μm)/solvent-containing gas barrier organic adhesive (3 μm)/vapor-deposited aluminum film (40 nm)/CPP (25 μm)
(Preparation of Solvent-Containing Gas Barrier Organic Adhesive)

The adhesive and solvent described below were mixed to prepare a solvent-containing gas barrier organic adhesive.
Adhesive: 19 parts by mass of PASLIM VM001/VM102 CP (manufactured by DIC Corporation)
Solvent: 15 parts by mass of ethyl acetate
<Evaluation>
[Lamination Properties]

From the laminate obtained in each of Examples and Comparative Examples, a test piece was cut out in the form of a strip having a width of 15 mm. The maximum load at the time of delaminating the test piece between the base material layer and the sealant layer by a T-shaped delamination method (tensile speed: 50 mm/min) in an atmosphere at 25° C. using a Tensilon tensile tester (RTC-1310A manufactured by ORIENTEC CORPORATION) was measured, and defined as a lamination strength (N/15 mm). Further, a delaminated interface portion was examined. Expressions in Table 1 have the meanings described below.

VM/CPP: delaminated at the interface between the vapor-deposited layer and the CPP layer.

PE/VM: delaminated at the interface between the polyethylene layer and the vapor-deposited layer.

Adhesive/VM: delaminated at the interface between the adhesive layer and the vapor-deposited layer.

[Gas Barrier Properties]

(1) Oxygen Permeability

Each laminate was cut to the A4 size, and using OXTRAN 2/20 manufactured by MOCON, Inc. (United States), the oxygen permeability (cc/m²/day/atm) was measured at 23° C. and 90% RH.

(2) Water Vapor Permeability

Each laminate was cut to the A4 size, and using PERMATRAN 3/31 manufactured by MOCON, Inc. (United States), the water vapor permeability (g/m²/day/atm) was measured at 40° C. and 90% RH.

(3) After Application of Bending Load

After a bending load was applied five times by a Gelbo Flex tester, the oxygen permeability and water vapor permeability were measured by the same method and under the same conditions as described above.

[Solvent Content]

The total amount (mg/m²) of toluene, ethyl acetate, IPA, methanol and MEK in the film was measured by a DNP method. A test piece was rated acceptable when the total amount of solvents was 0 or 6 mg/m² or less.

TABLE 3

| | | | | | Examples | | | |
|---|---|---|---|---|---|---|---|---|
| | Types | | Details | Unit | 10 | 11 | 12 | 13 |
| Layer configuration of laminate | Base material layer | Base material | CPP (with corona-treated lower surface) | μm | 20 | 20 | 20 | 20 |
| | | | AC Coating | g/m2 | | | | |
| | | Adhesive | Two-pack curable solvent-free adhesive A | μm | 3 | 0.5 | 0.8 | 1.2 |
| | | | Two-pack curable urethane adhesive | μm | | | | |
| | | | Polyethylene | μm | | | | |
| | | Base material | Vapor-deposited layer (aluminum) | nm | | | | |
| | | | PET (with upper surface coated with aluminum by vapor deposition) | μm | | | | |
| | | | AC Coating | g/m2 | | | | |
| | Adhesive layer | Adhesive | Two-pack curable urethane adhesive | μm | | | | |
| | | | Polyethylene | μm | | | | |
| | Sealant layer | Vapor-deposition | Vapor-deposited layer (aluminum) | nm | 40 | 40 | 40 | 40 |
| | | Sealant | Easily peelable CPP (with upper surface coated with aluminum by vapor deposition) | μm | 25 | 25 | 25 | 25 |
| | | | CPP (with upper surface coated with aluminum by vapor deposition) | μm | | | | |
| | | | CPP (with corona-treated upper surface) | μm | | | | |
| | | | Easily peelable CPP | μm | | | | |
| | Total number of constituent layers | | | layers | 4 | 4 | 4 | 4 |
| | Aging conditions | | | — | 40° C. for 3 days | 40° C. for 3 days | 40° C. for 3 days | 40° C. for 3 days |
| Evaluation results | | Solvent content of adhesive layer | | mg/m2 | 0.5 | 0.08 | 0.1 | 0.2 |
| | Gas barrier properties | Oxygen permeability (23° C.90% RH) | Before packing | cc/m2/day/atm | 0.55 | 2.20 | 1.10 | 0.95 |
| | | | After packing | cc/m2/day/atm | 6.40 | 22.86 | 17.37 | 10.97 |
| | | | Increase from value before packing | cc/m2/day/atm | 5.85 | 19.50 | 18.20 | 10.01 |
| | | Water vapor permeability (40° C.90% RH) | Before packing | g/m2/day/atm | 0.22 | 0.80 | 0.30 | 0.26 |
| | Lamination properties | | Strength | N/15 mm | 1.58 | 1.6 | 1.65 | 1.59 |
| | | | Delaminated interface | — | VM/CPP | VM/CPP | VM/CPP | VM/CPP |
| | Sealing strength of packaging material | | | N/15 mm | 12.5 | 13.0 | 11.9 | 12.5 |

| | | | | | Examples | | Comparative Examples | |
|---|---|---|---|---|---|---|---|---|
| | Types | | Details | Unit | 14 | 15 | 8 | 9 |
| Layer configuration of laminate | Base material layer | Base material | CPP (with corona-treated lower surface) | μm | 20 | 20 | 20 | 20 |
| | | | AC Coating | g/m2 | | | | |
| | | Adhesive | Two-pack curable solvent-free adhesive A | μm | 1.6 | 6 | | |
| | | | Two-pack curable urethane adhesive | μm | | | 3 | 3 |
| | | | Polyethylene | μm | | | | |
| | | Base material | Vapor-deposited layer (aluminum) | nm | | | | 40 |
| | | | PET (with upper surface coated with aluminum by vapor deposition) | μm | | | | 12 |
| | | | AC Coating | g/m2 | | | | |
| | Adhesive layer | Adhesive | Two-pack curable urethane adhesive | μm | | | | 3 |
| | | | Polyethylene | μm | | | | |
| | Sealant layer | Vapor-deposition | Vapor-deposited layer (aluminum) | nm | 40 | 40 | 40 | |
| | | Sealant | Easily peelable CPP (with upper surface coated with aluminum by vapor deposition) | μm | 25 | 25 | | |
| | | | CPP (with upper surface coated with aluminum by vapor deposition) | μm | | | 25 | |
| | | | CPP (with corona-treated upper surface) | μm | | | | 25 |
| | | | Easily peelable CPP | μm | | | | |

TABLE 3-continued

|  |  |  |  |  |  |  |  |  |
|---|---|---|---|---|---|---|---|---|
|  |  | Total number of constituent layers |  | layers | 4 | 4 | 4 | 6 |
|  |  | Aging conditions |  | — | 40° C. for 3 days | 40° C. for 3 days | 25° C. for 1 day | 25° C. for 1 day |
| Evaluation results | Gas barrier properties | Solvent content of adhesive layer |  | mg/m2 | 0.28 | 1.7 | 4.2 | 1.1 |
|  |  | Oxygen permeability (23° C.90% RH) | Before packing | cc/m2/day/atm | 0.88 | 0.33 | 4.58 | 0.64 |
|  |  |  | After packing | cc/m2/day/atm | 10.06 | 5.03 | 29.20 | 7.05 |
|  |  |  | Increase from value before packing | cc/m2/day/atm | 9.10 | 5.20 | 24.62 | 6.34 |
|  |  | Water vapor permeability (40° C.90% RH) | Before packing | g/m2/day/atm | 0.24 | 0.20 | 0.51 | 0.46 |
|  | Lamination properties |  | Strength | N/15 mm | 1.61 | 1.62 | 1.81 | 1.96 |
|  |  |  | Delaminated interface | — | VM/CPP | VM/CPP | VM/CPP | Adhesive/VMPET |
|  |  | Sealing strength of packaging material |  | N/15 mm | 12.1 | 12.8 | 15.4 | 35.0 |

|  |  |  |  |  | Comparative Examples | |
|---|---|---|---|---|---|---|
|  | Types |  | Details | Unit | 10 | 11 |
| Layer configuration of laminate | Base material layer | Base material | CPP (with corona-treated lower surface) | μm | 20 | 20 |
|  |  |  | AC Coating | g/m2 | 3 |  |
|  |  | Adhesive | Two-pack curable solvent-free adhesive A | μm |  | 0.1 |
|  |  |  | Two-pack curable urethane adhesive | μm |  |  |
|  |  |  | Polyethylene | μm | 7 |  |
|  |  | Base material | Vapor-deposited layer (aluminum) | nm | 40 |  |
|  |  |  | PET (with upper surface coated with aluminum by vapor deposition) | μm | 12 |  |
|  |  |  | AC Coating | g/m2 | 3 |  |
|  | Adhesive layer | Adhesive | Two-pack curable urethane adhesive | μm |  |  |
|  |  |  | Polyethylene | μm | 7 |  |
|  | Sealant layer | Vapor-deposition | Vapor-deposited layer (aluminum) | nm |  | 40 |
|  |  | Sealant | Easily peelable CPP (with upper surface coated with aluminum by vapor deposition) | μm |  | 25 |
|  |  |  | CPP (with upper surface coated with aluminum by vapor deposition) | μm |  |  |
|  |  |  | CPP (with corona-treated upper surface) | μm |  |  |
|  |  |  | Easily peelable CPP | μm | 18 |  |
|  |  | Total number of constituent layers |  | layers | 8 | 4 |
|  |  | Aging conditions |  | — | 25° C. for 1 day | 40° C. for 3 days |
| Evaluation results | Gas barrier properties | Solvent content of adhesive layer |  | mg/m2 | 1.1 | 0.03 |
|  |  | Oxygen permeability (23° C.90% RH) | Before packing | cc/m2/day/atm | 0.56 | 6.60 |
|  |  |  | After packing | cc/m2/day/atm | 6.83 | 68.57 |
|  |  |  | Increase from value before packing | cc/m2/day/atm | 6.27 | 58.50 |
|  |  | Water vapor permeability (40° C.90% RH) | Before packing | g/m2/day/atm | 0.42 | 2.40 |
|  | Lamination properties |  | Strength | N/15 mm | 0.95 | 1.61 |
|  |  |  | Delaminated interface | — | PE/VM | VM/CPP |
|  |  | Sealing strength of packaging material |  | N/15 mm | 13.0 | 12.3 |

[Summary of Results]

In Examples 10 to 15, the total number of constituent layers was 4, but the gas barrier properties were equivalent to or higher than those of the conventional gas barrier laminate of Comparative Example 10 in which the total number of constituent layers was 8.

In Examples 10 to 15 where the solvent-free gas barrier organic adhesive layer (B) formed using the two-pack curable solvent-free adhesive A was present with a thickness of 0.5 to 6 μm, and the easily openable sealant layer (D) was present, the gas barrier properties were higher than those in Comparative Examples 8 to 10 using a conventional two-liquid curable urethane adhesive, the solvent-free gas barrier organic adhesive layer (B) had a low solvent content, and a favorable packaging material sealing strength was exhibited. On the other hand, in Comparative Example 11 where the thickness of the solvent-free gas barrier organic adhesive layer (B) was as small as 0.1 μm, the gas barrier properties were insufficient.

Further, in Comparative Examples 8 and 9 using a normal two-pack curable urethane adhesive containing a solvent, the adhesive layer had a large solvent content.

The invention claimed is:

1. A gas barrier laminate comprising a base material layer (A), a gas barrier adhesive layer (B), a gas barrier vapor-deposited inorganic layer (C), and a sealant layer (D) in this order, wherein the gas barrier adhesive layer (B) is adjacent to and in contact with the gas barrier vapor-deposited inorganic layer (C) and the gas barrier vapor-deposited inorganic layer (C) is formed directly on and in contact with the sealant layer (D),
   wherein the gas barrier vapor-deposited inorganic layer (C) comprises one or more selected from the group consisting of vapor-deposited aluminum, vapor-deposited alumina, and vapor-deposited silica, said gas barrier vapor-deposited inorganic layer (C) having a thickness of 1 to 100 nm,
   wherein the gas barrier adhesive layer (B) is a gas barrier organic adhesive layer having a solvent content of 0.5 mg/m$^2$ or less, a glass transition temperature of −30 to 80° C., and a thickness of 0.5 to 6.0 μm, wherein the gas barrier organic adhesive layer is formed by curing a two-pack curable adhesive, wherein the two-pack curable adhesive is the reaction product of components consisting of
100 parts by mass of a polycarboxylic acid-modified polyester polyol (J) having a number average molecular weight of about 520,
a hydroxyl value of about 216 mg KOH/g, and
an acid value of about 96 mg KOH/g;
about 50 parts by mass of hexamethylene diisocyanate; and
about 29 parts by mass of metaxylylene diisocyanate,
wherein the sealant layer (D) consists of one or more heat-sealable resins, said sealant layer (D) having a thickness of 15 to 100 μm and a sealing strength of 2 to 20 N/15 mm measured by a T-shaped delamination method at 25° C. and tensile speed of 50 mm/min,
wherein the base material layer (A) comprises one or more selected from the group consisting of uniaxially oriented polyester film, biaxially oriented polyester film, biaxially oriented polypropylene film, uniaxially oriented polyamide film, and biaxially oriented polyamide film, said base material layer (A) having a thickness of 1 to 300 μm, and
wherein the gas barrier laminate exhibits an oxygen permeability of 0.05 to 2.0 $cm^3/m^2$/day/atm at 23° C. and 90% RH, and a water vapor permeability of 0.01 to 2.0 $g/m^2$/day/atm at 40° C. and 90% RH.

2. The gas barrier laminate according to claim 1, wherein the sealant layer (D) is a peelable film of an interfacial peeling type, a cohesive peeling type, or an interlayer peeling type.

3. The gas barrier laminate according to claim 1, comprising a gas barrier coating film layer (E) between the base material layer (A) and the gas barrier adhesive layer (B), the gas barrier coating film layer (E) containing a hydrolytic polycondensation product of a mixture of a metal alkoxide and a water-soluble polymer by a sol-gel process.

4. The gas barrier laminate according to claim 1, comprising a print layer (F) between the base material layer (A) and the gas barrier adhesive layer (B).

5. The gas barrier laminate according to claim 1, wherein the gas barrier vapor-deposited inorganic layer (C) has a thickness of 10 to 40 nm.

6. The gas barrier laminate according to claim 1, wherein the total number of constituent layers is not more than 6.

7. The gas barrier laminate according to claim 1, wherein the gas barrier adhesive layer (B) further comprises a plate-shaped inorganic compound (M).

8. The gas barrier laminate according to claim 7, wherein the plate-shaped inorganic compound (M) is selected from the group consisting of: kaolinite-serpentine clay minerals, pyrophyllite-talc groups, and combinations thereof.

9. The gas barrier laminate according to claim 1, wherein the gas barrier adhesive layer (B) further comprises a phosphoric acid modified compound (L) selected from the group consisting of phosphoric acid, pyrrolic acid, triphosphoric acid, methyl acid phosphate, ethyl acid phosphate, butyl acid phosphate, dibutyl phosphate, 2-ethylhexyl acid phosphate, bis(2-ethylhexyl) phosphate, isododecyl acid phosphate, butoxy ethyl acid phosphate, oleyl acid phosphate, tetracosyl acid phosphate, 2-hydroxyethyl methacrylate acid phosphate, polyoxyethylene alkyl ether phosphates, and combinations thereof.

10. A gas barrier packaging material for packaging bags and bags for retort treatment, the gas barrier packaging material comprising the gas barrier laminate according to claim 1.

11. A pillow packaging bag comprising the gas barrier laminate according to claim 1.

* * * * *